(12) United States Patent
Li et al.

(10) Patent No.: US 9,957,437 B2
(45) Date of Patent: May 1, 2018

(54) CARBONYL FUNCTIONAL INVERSION AGENTS FOR WATER-IN-OIL LATICES AND METHODS OF USE

(71) Applicant: Ecolab USA Inc., St. Paul, MN (US)

(72) Inventors: Xiaojin Harry Li, Palatine, IL (US); Anand Parthasarathy, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days. days.

(21) Appl. No.: 15/228,446

(22) Filed: Aug. 4, 2016

(65) Prior Publication Data

US 2017/0037298 A1  Feb. 9, 2017

Related U.S. Application Data

(60) Provisional application No. 62/202,196, filed on Aug. 7, 2015.

(51) Int. Cl.
*E21B 43/22* (2006.01)
*C09K 8/588* (2006.01)
*C08F 220/56* (2006.01)

(52) U.S. Cl.
CPC ............ *C09K 8/588* (2013.01); *C08F 220/56* (2013.01)

(58) Field of Classification Search
CPC ...... C09K 8/588; C09K 2208/08; C09K 3/00; C09K 8/685; C09K 8/70; C09K 8/72; C09K 8/80; E21B 43/20
See application file for complete search history.

(56) References Cited

U.S. PATENT DOCUMENTS

| | | |
|---|---|---|
| 4,034,809 A | 7/1977 | Phillips et al. |
| 4,525,496 A | 6/1985 | Adaway et al. |
| 5,018,577 A | 5/1991 | Pardue et al. |
| 5,023,000 A | 6/1991 | Kneller et al. |
| 5,085,794 A | 2/1992 | Kneller et al. |
| 5,185,393 A | 2/1993 | Kanda et al. |
| 5,679,740 A | 10/1997 | Heitner et al. |
| 6,572,789 B1 | 6/2003 | Yang et al. |
| 6,822,068 B2 | 11/2004 | Sunder et al. |
| 7,300,973 B2 | 11/2007 | Chang et al. |
| 8,383,560 B2 | 2/2013 | Pich et al. |
| 8,640,774 B1 | 2/2014 | Frederick et al. |
| 2011/0092743 A1 | 4/2011 | Li et al. |
| 2014/0051620 A1 | 2/2014 | Soane et al. |
| 2014/0209304 A1 | 7/2014 | Reed et al. |

FOREIGN PATENT DOCUMENTS

| | | |
|---|---|---|
| CA | 2911366 A1 | 11/2014 |
| WO | 2005058977 A1 | 6/2005 |

OTHER PUBLICATIONS

Sunder et al, Macromolecules (1999) 32: pp. 4240-4246.
Garcia-Bernabé et al, Chem. Eur. J. (2004) 10: pp. 2822-2830.
Siegers et al, Chem. Eur. J (2004) 10: pp. 2831-2838.
Haag et al, J. Am. Chem. Soc. (2000) 122: pp. 2954-2955.
International Search Report PCT/US2016/045541, dated Nov. 8, 2016.
International Search Report PCT/US2016/045546, dated Nov. 14, 2016.
International Search Report PCT/US2016/045590, dated Nov. 20, 2016.
Written Opinion PCT/US2016/045541, dated Nov. 14, 2016.
Written Opinion PCT/US2016/045546, dated Nov. 14, 2016.
Written Opinion PCT/US2016/045590, dated Nov. 20, 2016.

*Primary Examiner* — Zakiya W Bates
(74) *Attorney, Agent, or Firm* — Kagan Binder, PLLC

(57) ABSTRACT

Water-in-oil latices of water soluble or dispersible polymers and methods of using the same are presented. The latices include carbonyl functional inversion agents that provide rapid and complete inversion of the latices under conditions wherein the water source used to invert the latex is provided at high temperature, or includes a high level of total dissolved solids, or is both high temperature and high total dissolved solids.

22 Claims, 6 Drawing Sheets

CARBONYL FUNCTIONAL INVERSION AGENTS FOR WATER-IN-OIL LATICES AND METHODS OF USE

TECHNICAL FIELD

The invention relates to water-in-oil latices of water dispersible polymers and compositions that provide for rapid inversion of the latices when diluted.

BACKGROUND

Crude oil development and production can include up to three distinct phases: primary, secondary, and tertiary (or enhanced) recovery. During primary recovery, the natural pressure of the reservoir or gravity drives oil into the wellbore, combined with artificial lift techniques (such as pumps) which bring the oil to the surface. But only about 10 percent of a reservoir's original oil in place is typically produced during primary recovery. Secondary recovery techniques extend a field's productive life generally by injecting water or gas to displace oil and drive it to a production wellbore, resulting in the recovery of 20 to 40 percent of the original oil in place.

Enhanced oil recovery, or EOR, is a generic term encompassing techniques for increasing the amount of crude oil that can be extracted from a subterranean formation such as an oil field. EOR techniques offer prospects for ultimately producing 30 to 60 percent, or more, of the reservoir's original oil in place. Three major categories of EOR have been found to be commercially successful to varying degrees:

Thermal recovery is the introduction of heat such as the injection of steam to lower the viscosity of the oil and improve its ability to flow through the reservoir.

Gas injection is the injection of gases such as natural gas, nitrogen, or carbon dioxide that expand in a reservoir to push additional oil to a production wellbore, or gases that dissolve in the oil to lower its viscosity and improve flow rate.

Chemical injection is the injection of polymer dispersions to increase the effectiveness of waterfloods, or the use of detergent-like surfactants to help lower the surface tension that often prevents oil droplets from moving through a reservoir. Chemical injection of a polymer is also referred to as polymer flooding. This method improves the vertical and areal sweep efficiency as a consequence of improving the water/oil mobility ratio. In addition, the polymer reduces the contrasts in permeability by preferentially plugging the high permeability zones flooded. This forces the water to flood the lower permeability zones and increases the sweep efficiency. The art in this area is well-developed for conventional oil recovery applications.

Of these techniques, polymer flooding using water-in-oil (w/o) latex products is particularly favored for use in offshore reservoirs and other relatively isolated operations due to the ease of use and relatively simple equipment requirements. Polymer flooding is generally accomplished by dissolving the selected polymer in water and injecting the polymer solution into the reservoir. However, since the target concentration of polymer in the polymer dispersions is typically about 1 wt % or less, transport at the target concentration is not economically efficient. Transporting the dried polymers, while economically efficient for the supplier, is not favorable for field use due to limited space for dry polymer make-down equipment and difficulties in fully hydrating the polymers in the field. To address these issues, various formulations have been developed to allow economically feasible transportation and storage. Specialized methods have also been developed to convert the formulations to use concentrations of fully hydrated polymers in the field.

Organic polymers traditionally used in EOR include water soluble polymers such as polyacrylamide homopolymers and copolymers with acrylic acid or conjugate base thereof and/or one or more other water soluble monomers, and hydrophobically modified water soluble polymers, also called associative polymers or associative thickeners. Associative thickeners are typically copolymers of acrylamide, acrylic acid, or both with about 1 mole % or less of a hydrophobic monomer such as a $C_8$-$C_{16}$ linear or branched ester of acrylic acid. Any of these water soluble polymers are deliverable as a dry powder, as a gel-like concentrate in water, or in the water phase of a w/o latex. Of these formats, water-in-oil latices have the advantage of being deliverable in a liquid format that is easily handled in the field because the latex viscosity is lower than that of a water solution of comparable wt % polymer. The liquid products are also easy to make down with little equipment and a small space footprint compared to that of dry polymer products.

Commercial w/o latices are formulated for EOR by dissolving monomer(s) in a high-solids aqueous solution to form a water phase (or monomer phase), mixing one or more hydrocarbon solvents and a surfactant or a blend thereof having a hydrophilic-lipophilic balance (HLB) of about 2 to 10 to form an oil phase, mixing the two phases using techniques to result in a water-in-oil emulsion or latex, and polymerizing the monomer via a standard free-radical initiation. The w/o latex may be a macroemulsion, nanoemulsion, microemulsion, or combination thereof. The free radical initiation may be radiation, photo, thermal, or redox initiation, or any combination thereof. After polymerization is complete, a higher HLB surfactant (HLB>10) or a blend thereof having an HLB>10 is often added to facilitate latex inversion when water is added. "Inversion" is a term of art to describe the dilution of w/o latices with a water source, causing destabilization of the latex and subsequent dissolution of the concentrated polymer particles. In some cases, the higher HLB surfactant is added in the field, immediately prior to addition of water to dilute the latex; or is added in-line with the water source used to dilute the latex. In other cases, the higher HLB surfactant is added directly to the w/o latex after polymerization is complete, and the latex is stable or even shelf stable. In such cases, careful control of type and amount of surfactant is required to provide a sufficiently stable latex to facilitate storage and transportation, while providing for improved inversion performance in the field.

Recently, there has arisen the need to address polymer flooding in challenging conditions encountered in reservoirs wherein the ambient or produced water contacted by the polymer includes high total dissolved solids, such as a high saline or hardness content, in some cases involving total dissolved solids of up to about 30 wt %. In some cases the ambient or produced water is tap water, hard water, brackish water, municipal waste water, produced water, or seawater. Field operators strongly prefer to use such water sources to dilute polymer flooding formulations to final use concentrations rather than employ purified water sources. Reasons for the preference include reducing costs by diverting some or all of the water source already being injected into a reservoir to dilute the polymer flooding formulations and reducing the environmental impact associated with employing a purified water source. However, use of such water sources leads to difficulties in dispersing the high molecular weight polymers to use concentrations. Inversion of w/o latices in such water sources can result in slow inversion times and/or the requirement of multistage dilution and mixing procedures; it can also result in coagulation, precipitation, or gross phase separation of polymer upon or after contact of the latex with the diluted water environment. Thus there is a need to address inversion of w/o latices in field conditions where the use water source has high total dissolved solids.

Another need in the industry is to address reservoirs where the water source contacted by a w/o latex is at an extreme temperature, such as 30° C. to 100° C. or −10° C. to 10° C. Extreme temperature water sources lead to difficulties in dispersing high molecular weight, water soluble polymers delivered in w/o latices, similarly to the difficulties encountered in the use of high total dissolved solids water sources. In some cases, conditions of both extreme temperature and high total dissolved solids are encountered in the ambient or produced water source employed to dilute polymer flooding formulations to use concentrations. Such conditions cause instability of w/o latices during inversion, evidenced by formation of gel particles, coagulum, polymer coated out on contact surfaces, and gross coalescence of phases (conventionally referred to as "separation") and the like. The products of this instability cause plugged equipment in the field, reduced reservoir permeability, plugged formation, and ultimately failure to accomplish mobility control within the reservoir. These problems remain largely unaddressed by conventional formulations, methods, and equipment developed for inversion of w/o latices in the field. For example, formulations described in US Patent Application Publication No. 2014/0051620 A1, which comprise an inversion agent such as glycerol, do not provide satisfactory performance under conditions using water sources having high total dissolved solids, extreme temperature, or both.

As a result, there is a substantial need in the industry to develop technologies suitable for carrying out enhanced oil recovery in reservoirs where high temperature water sources, high total dissolved solids water sources, or both are used in conjunction with EOR. There is a substantial need in the industry for w/o polymer latices that invert rapidly to form stable, fully hydrated or dissolved polymer solutions at water temperatures of 30° C. to 100° C. There is a substantial need in the industry for w/o polymer latices that invert rapidly to form stable, fully hydrated or dissolved polymer solutions using water sources having up to 30 wt % total dissolved solids. There is a substantial need in the industry for w/o polymer latices that invert rapidly to form stable, fully hydrated or dissolved polymer solutions at polymer concentrations of 1 wt % or less using water sources having high total dissolved solids, high temperature, or both.

SUMMARY

Described herein are water-in-oil (w/o) latices. The latices are formed by combining about 0.1 wt % to 20.0 wt % of a carbonyl functional inversion agent with about 15 wt % to 70 wt % of a water soluble or dispersible polymer comprising 1 mol % to about 100 mol % acrylamide monomers; and about 0.1 wt % to 20.0 wt % of an inversion surfactant having a hydrophilic/lipophilic balance of 10 or greater. In some embodiments, the w/o latex comprises about 0.1 wt % to 5.0 wt % of a carbonyl functional inversion agent that is a hydrotrope; about 15 wt % to 70 wt % of the water soluble polymer; about 0.1 wt % to 20.0 wt % of the inversion surfactant; about 3 wt % to 50 wt % water; about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties; and about 20 wt % or less of a latex surfactant characterized as having a hydrophilic/lipophilic balance of between 2 and 10.

Also described herein is a method of forming an invertible latex, the method comprising a) forming a water-in-oil latex comprising about 15 wt % to 70 wt % of a water soluble or dispersible polymer; about 3 wt % to 50 wt % water; about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties; and about 20 wt % or less of a latex surfactant characterized as having a hydrophilic/lipophilic balance of between 2 and 10; and b) adding to the latex about 0.1 wt % to 20.0 wt % of an inversion surfactant characterized as having a hydrophilic/lipophilic balance of 10 or greater and about 0.1 wt % to 5.0 wt % of a carbonyl functional inversion agent to form an invertible latex.

Also described herein is a method of recovering hydrocarbon compounds from a subterranean reservoir, the method comprising a) forming an invertible latex comprising about 15 wt % to 70 wt % of a water soluble or dispersible polymer, about 3 wt % to 50 wt % water, about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties, and about 20 wt % or less of a latex surfactant characterized as having a hydrophilic/lipophilic balance of between 2 and 10; and adding to the latex about 0.1 wt % to 20.0 wt % of an inversion surfactant characterized as having a hydrophilic/lipophilic balance of 10 or greater and about 0.1 wt % to 5.0 wt % of a carbonyl functional inversion agent; b) adding a water source to the invertible latex in a single addition to form a polymer flooding solution comprising about 100 ppm to 10,000 ppm of the water soluble or dispersible polymer; c) injecting the polymer flooding solution into the subterranean reservoir; and d) recovering the hydrocarbon compounds.

Additional advantages and novel features of the invention will be set forth in part in the description that follows, and in part will become apparent to those skilled in the art upon examination of the following, or may be learned through routine experimentation upon practice of the invention.

Figure 5:
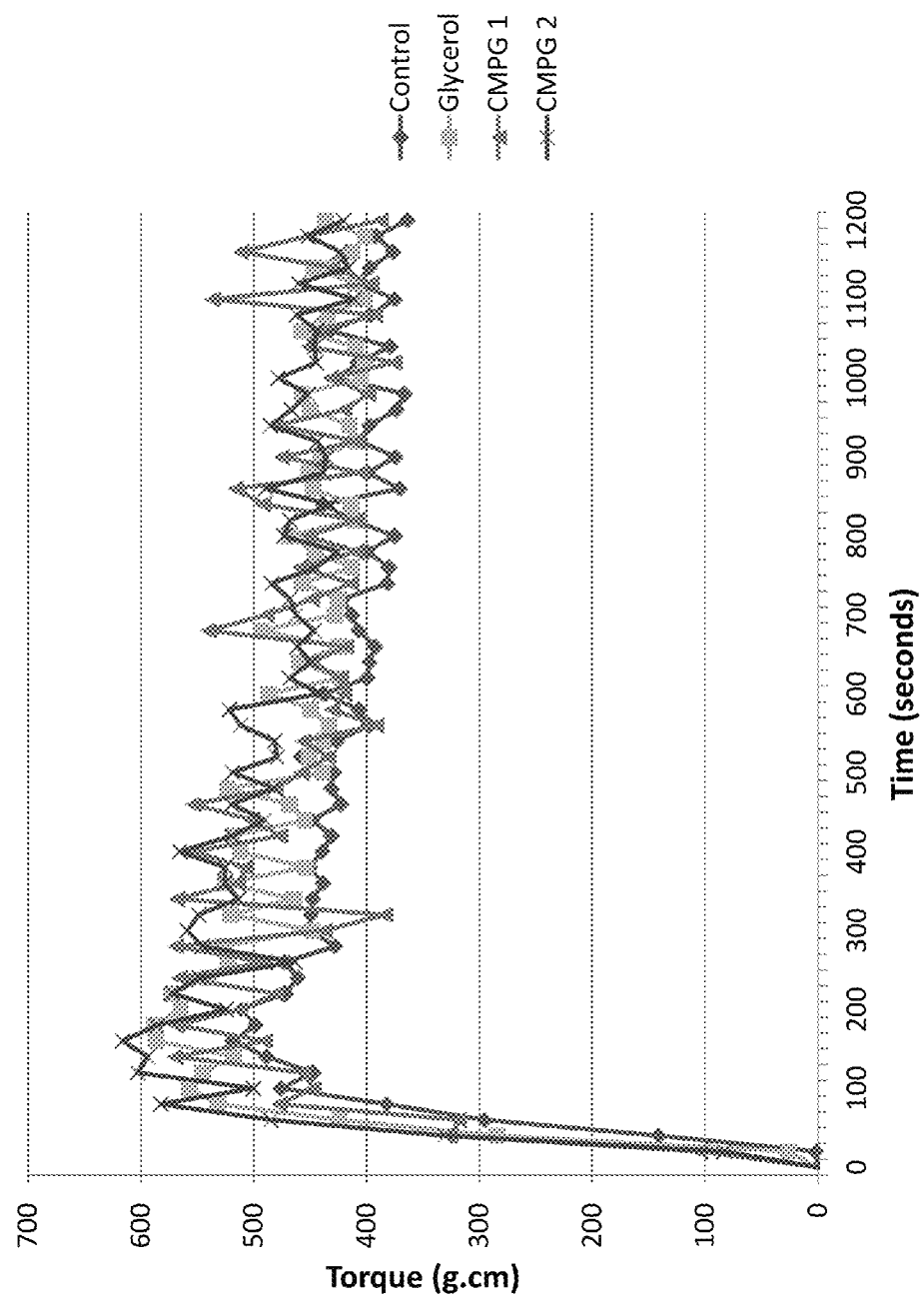

FIG. 5 is a line graph of torque monitor data at room temperature showing the invertibility of w/o latices comprising 3 wt % of a carbonyl functional inversion agent and 3.3% of TDA-12 as an inverting surfactant ([polymer]=10000 ppm in 3.5% SSW).

Figure 6:
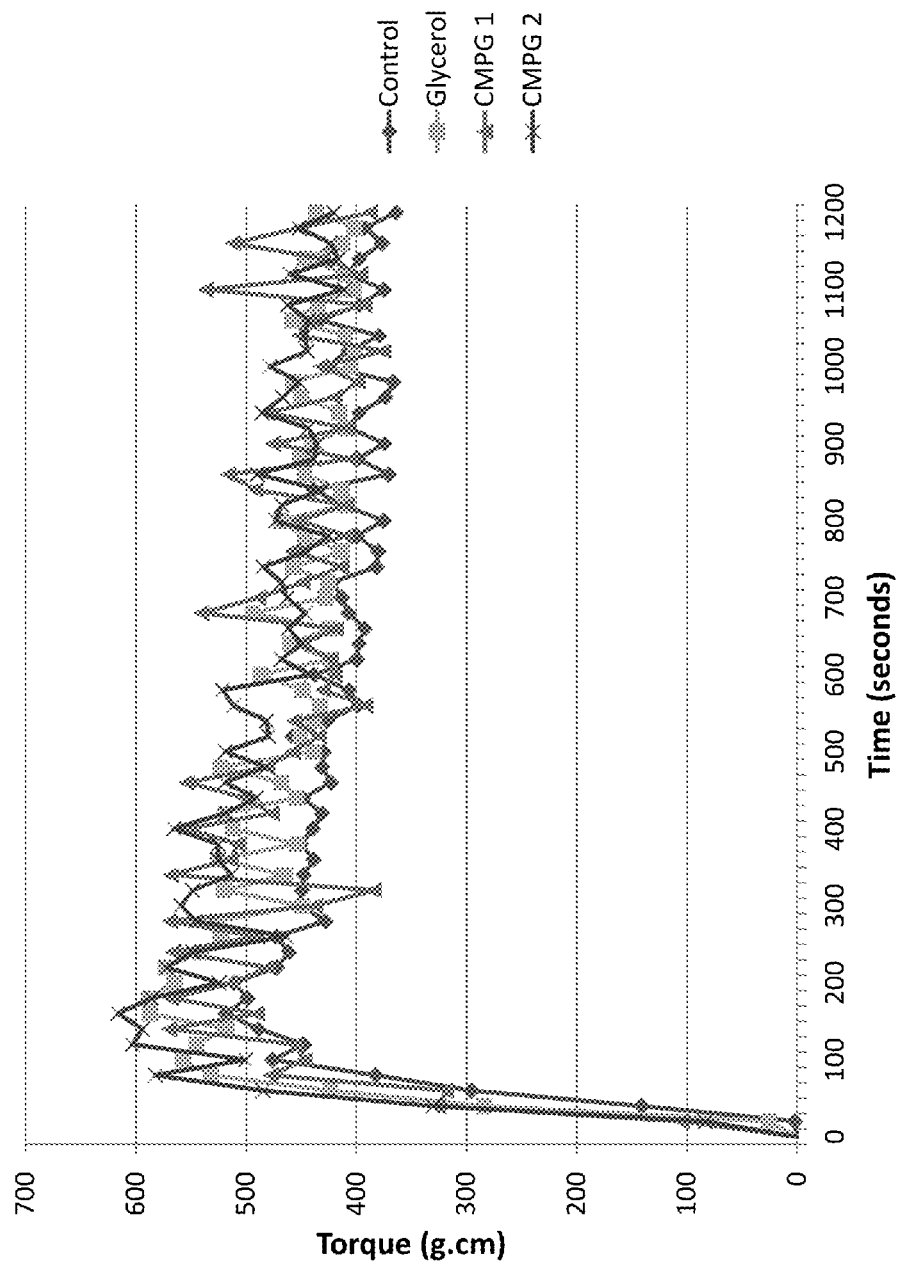

FIG. 6 is a line graph of torque monitor data at 4° C. showing the invertibility of w/o latices comprising 3 wt % of a carbonyl functional inversion agent and 3.3% of TDA-12 as an inverting surfactant ([polymer]=10000 ppm in 3.5% SSW).

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Definitions

As used herein, the term "polymer" means a water soluble or water dispersible polymer. The term "polymer" encompasses and includes homopolymers, copolymers, terpolymers and polymers with more than 3 monomers, crosslinked or partially crosslinked polymers, and combinations or blends of these.

The term "monomer" is used in context to mean an ethylenically unsaturated polymerizable compound or the polymerized residue thereof. As used herein, the term "anionic monomer" means an unsaturated compound or polymerized residue thereof bearing an acidic group, or a salt thereof. As used herein, the term "cationic monomer" means an unsaturated compound or polymerized residue thereof bearing a positive charge, or a salt thereof.

As used herein, the term "polymer solution" or "polymer dispersion" means a polymer composition substantially dispersed or dissolved in water, a water source, or a water-based solution. The polymer solution is a solution as formed, or in the case of some EOR applications the solution before injection, during injection, or after injection as determined by context. Water-based solutions include one or more dissolved salts, buffers, acids, bases, surfactants, or other dissolved, dispersed, or emulsified compounds, materials, components, or combinations thereof.

As used herein, the term "water source" means a source of water comprising, consisting essentially of, or consisting of fresh water, deionized water, distilled water, produced water, municipal water, waste water such as runoff water or municipal waste water, treated or partially treated waste water, well water, brackish water, "gray water", sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 30 wt % total dissolved solids. Generally and as determined by context, the term "water source" includes high total dissolved solids water sources, high temperature water sources, and water sources that are both high total dissolved solids and high temperature water sources.

As used herein, the term "high temperature" means about 30° C. to 100° C., as specified or determined by context.

As used herein, the term "high total dissolved solids" refers to a water source having at least 1 wt % non-polymeric solids dissolved therein, and in embodiments up to about 30 wt % non-polymeric solids dissolved therein. In general, "saline" or "salinity" refers to a water source wherein a portion, in some embodiments a substantial portion, of the total dissolved solids are salts, as determined by context.

As used herein, the terms "water-in-oil latex" or "w/o latex" mean a discontinuous internal water phase within a continuous oil phase, wherein the water phase includes at least one monomer or polymer. In general and as determined by context, these terms denote a latex prior to addition of inverting surfactants.

As used herein, the term "oil" or "hydrocarbon solvent" as applied to an oil phase of a water-in-oil latex, means any compound or blend thereof that is less than 0.1 wt % soluble in water at 25° C., is substantially chemically inert within a w/o latex as described herein, and is a liquid over at least the range of 20° C. to 100° C.

As used herein, the term "water phase" means a water source having at least a monomer or polymer dispersed or dissolved therein, further wherein the dispersion or solution is a discontinuous phase within a w/o latex.

As used herein, the term "stable" as applied to a latex or emulsion means a kinetically stable latex or emulsion that absent any force applied, temperature change, or chemical added to a latex, the latex is or is capable of being substantially free of coagulation, plating out, precipitation, gross coalescence of phases (conventionally referred to as "separation") or any other evidence of instability conventionally associated with water-in-oil latices for at least about 24 hours at about 20° C. As used herein, the term "shelf stable" means stable for at least 2 months. As used herein, the term "freeze-thaw stable" means stable after at least 1 freeze-thaw cycle.

As used herein, the term "invertible latex" means a w/o latex additionally including at least one inversion surfactant and at least one inversion agent, the inversion agent comprising at least one carbonyl functional compound.

As used herein, the term "invert" or "inversion" as applied to the w/o latices of the invention means to contact an invertible latex with a water source in an amount sufficient to form a polymer flooding solution.

As used herein, the term "polymer flooding solution" or "polymer solution" means a polymer solution or dispersion of about 100 ppm (0.01 wt %) to 10,000 ppm (1.00 wt %) resulting from the inversion of an invertible latex.

As used herein, the term "single component" as applied to the w/o latices of the invention means that at least one inversion surfactant and at least one inversion agent are added to an existing w/o latex and the combination is shelf stable. The term is used in contrast to inversion surfactants or other compounds added in-line during injection and inversion.

As used herein, the term "optional" or "optionally" means that the subsequently described component, event or circumstance may be, but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Water-in-Oil Latices

We have found inversion agents that provide rapid and complete inversion of water-in-oil (w/o) latices of water soluble polymers under conditions wherein the water source used to invert the latex is provided at high temperature, or includes a high level of total dissolved solids, or is both high temperature and high total dissolved solids. The w/o latices useful in conjunction with the compositions and methods of the invention are conventional latices employed in one or more EOR applications, wherein the inversion agents are added to the w/o latices to facilitate inversion to yield a polymer solution for EOR. Polymer solutions for EOR conventionally target a concentration of about 1.00 wt % or less. The compositions and methods of the invention are easily carried out using conventional materials and equipment familiar to one of skill in w/o latex formation for EOR.

Polymers useful in the w/o latices include conventional EOR polymers as well as variations, mixtures, or derivatives thereof. The invention is not particularly limited as to the polymer employed in the water phase of the w/o latices, however, in embodiments the polymer is water soluble or fully dispersible to result in increased viscosity suitable for one or more EOR applications at concentrations of 1 wt % or less. Thus, polyacrylamides, polyacrylates, copolymers thereof, and hydrophobically modified derivatives of these (associative thickeners) are the most commonly employed EOR polymers; all are usefully employed in the w/o latices. Associative thickeners typically include about 1 wt % or less, based on total weight of dry polymer, of a monomer having a long-chain hydrocarbon functionality intended to produce physical or associative crosslinking in a water-based polymer dispersion. Such hydrophobically associating moieties are well known in the industry. In some embodiments, the hydrocarbyl functionality includes 8 to 20 carbons, or 10 to 20 carbons, or 12 to 20 carbons arranged in a linear, branched, or cyclic conformation. In some embodiments, the hydrophobically associating monomers are present in the polymer compositions at about 1 wt % or less of the total weight of the polymer composition, for example about 0.01 wt % to 1.00 wt %, or about 0.1 wt % to 1.00 wt %, or about 0.20 wt % to 1.00 wt % of the total weight of the polymer composition.

Other monomers usefully incorporated into the polymers and copolymers with acrylamide, acrylic acid, or both include cationic monomers, anionic monomers, and nonionic monomers. Nonlimiting examples of cationic monomers include N,N-diallyl-N,N-dimethylammonium chloride (DADMAC), N-alkyl ammonium salts of 2-methyl-1-vinyl imidazole, N-alkyl ammonium salts of 2-vinyl pyridine or 4-vinyl pyridine, N-vinyl pyridine, and trialkylammonium alkyl esters and amides derived from acrylic acid or acrylamide, respectively. Nonlimiting examples of anionic monomers include methacrylic acid, 2-acrylamido-2-methylpropane sulfonic acid (AMS), vinylphosphonic acid, and vinyl sulfonic acid and conjugate bases or neutralized forms thereof (salts). Nonlimiting examples of nonionic monomers include methacrylamide and alkyl ester or amide derivatives of acrylic acid or acrylamide, such as N-methyl acrylamide or butyl acrylate.

Polymers employed for EOR are desirably high molecular weight, as conventionally employed in EOR applications. Higher molecular weight increases the efficacy of the polymers in viscosifying water. However, higher molecular weight also increases difficulty in dissolution due to the high level of chain entanglement between polymer strands as well as strong hydrogen bonding between polymer functionalities such as amides and carboxylates. In embodiments, the polymers usefully incorporated in the w/o latices have a weight average molecular weight ($M_w$) of about $5 \times 10^5$ to $1 \times 10^8$ g/mol, or about $1 \times 10^6$ to $5 \times 10^7$ g/mol, or about $5 \times 10^6$ to $2 \times 10^7$ g/mol.

In embodiments, any polymer(s) useful in the w/o latices disclosed herein includes a cross-linking monomer or polymer. The crosslinker may be labile, non-labile, or a combination thereof. The labile crosslinker may be a glyoxal cross-linking monomer as described in U.S. Patent Application Publication No. 2014/0209304, which is incorporated by reference herein in its entirety. The non-labile crosslinker may be methylene bis(acrylamide) as described in U.S. Pat. No. 7,300,973, which is incorporated by reference herein in its entirety. In embodiments, the polymer comprises about 1 mol % to about 100 mol % acrylamide monomers, or about 1 mol % to about 90 mol %, or about 1 mol % to about 80 mol %, or about 1 mol % to about 70 mol %, or about 1 mol % to about 60 mol %, or about 1 mol % to about 50 mol %, or about 1 mol % to about 40 mol %, or about 1 mol % to about 30 mol %, or about 1 mol % to about 20 mol %, or about 1 mol % to about 10 mol %, or about 10 mol % to about 100 mol %, or about 20 mol % to about 100 mol %, or about 30 mol % to about 100 mol %, or about 40 mol % to about 100 mol %, or about 50 mol % to about 100 mol %, or about 60 mol % to about 100 mol %, or about 70 mol % to about 100 mol %, or about 80 mol % to about 100 mol %, or about 90 mol % to about 100 mol %, or about 20 mol % to about 80 mol %, or about 30 mol % to about 70 mol %, or about 40 mol % to about 60 mol %, or about 60 mol % to about 80 mol % acrylamide monomers.

In embodiments, the polymer comprises about 0.1 ppm to about 20000 ppm labile or non-labile cross-linked monomer units based on the weight of the polymer, or about 0.1 ppm to about 10000 ppm, or about 0.1 ppm to about 5000 ppm, or about 0.1 ppm to about 1000 ppm, or about 0.1 ppm to about 100 ppm, or about 1 ppm to about 20000 ppm, or about 10 ppm to about 20000 ppm, or about 100 ppm to about 20000 ppm, or about 1000 ppm to about 20000 ppm, or about 5000 ppm to about 20000 ppm, or about 10000 ppm to about 20000 ppm, or about 100 ppm to about 10000 ppm, or about 1000 ppm to about 5000 ppm cross-linked monomer units based on the weight of the polymer. In embodiments, the cross-linking monomer is glyoxal bis(acrylamide).

In embodiments, the polymer including the cross-linking monomer comprises about 100 ppm to about 10000 ppm of a w/o latex, or about 100 ppm to about 5000 ppm, or about 100 ppm to about 1000 ppm, or about 100 ppm to about 500 ppm, or about 500 ppm to about 10000 ppm, or about 1000 ppm to about 10000 ppm, or about 5000 ppm to about 10000 ppm, or about 500 ppm to about 5000 ppm, or about 100 ppm to about 1000 ppm, of a w/o latex.

In embodiments, one or more polymers are present substantially within the water phase in an w/o latex. In embodiments, the polymers are present within the w/o latices at about 15 wt % to 70 wt % based on the total weight of the latex, or about 17 wt % to 70 wt %, or about 19 wt % to 70 wt %, or about 21 wt % to 70 wt %, or about 23 wt % to 70 wt %, or about 25 wt % to 70 wt %, or about 15 wt % to 68 wt %, or about 15 wt % to 66 wt %, or about 15 wt % to 64 wt %, or about 15 wt % to 62 wt %, or about 15 wt % to 60 wt %, or about 15 wt % to 58 wt %, or about 15 wt % to 56 wt %, or about 25 wt % to 65 wt %, or about 30 wt % to 60 wt %, or about 30 wt % to 60 wt % based on the total weight of the latex.

The polymers present within the water phase of a w/o latex are often, though not exclusively, formed in situ by dissolving one or more monomers in the water phase, then adding a water phase into an oil phase bearing a surfactant to form the emulsion, followed by polymerization of the monomers to form a polymer w/o latex. Such latices are used for EOR applications.

Also present in the w/o latex is an amount of water sufficient to form a water phase within the latex. Water is present in the w/o latex at about 3 wt % to 50 wt % based on the total weight of the latex, or about 5 wt % to 50 wt %, or about 10 wt % to 50 wt %, or about 15 wt % to 50 wt %, or about 20 wt % to 50 wt %, or about 25 wt % to 50 wt %, or about 3 wt % to 45 wt %, or about 3 wt % to 40 wt %, or about 3 wt % to 35 wt %, or about 3 wt % to 30 wt %, or about 3 wt % to 25 wt %, or about 5 wt % to 45 wt %, or about 5 wt % to 40 wt %, or about 5 wt % to 35 wt %, or about 5 wt % to 30 wt %, or about 5 wt % to 25 wt % based on the total weight of the w/o latex. In some embodiments, the water is a water source.

Also present in the w/o latex is an amount of oil sufficient to form an oil phase within the latex. In some embodiments, the oil is not flammable at temperatures less than about 90° C., or less than about 80° C., or less than about 70° C. In some embodiments, the oil is a mixture of compounds, wherein the mixture is less than 0.1 wt % soluble in water at 25° C. and is substantially a liquid over the range of 20° C. to 90° C. In some embodiments, the oil comprises, consists essentially of, or consists of one or more linear, branched, or cyclic hydrocarbon moieties, aryl or alkaryl moieties, or combinations of two or more such moieties. In some embodiments, the oil has a density of about 0.8 g/L to 1.0 g/L, for example about 0.8 g/L to 0.9 g/L. Examples of suitable oils include decane, dodecane, isotridecane, cyclohexane, toluene, xylene, and mixed paraffin solvents such as those sold under the trade name ISOPAR® by ExxonMobil Corp. of Irving, Tex. In embodiments, the oil is present in the w/o latex at about 10 wt % to 40 wt % based on the total weight of the w/o latex, or about 15 wt % to 40 wt %, or about 20 wt % to 40 wt %, or about 22 wt % to 40 wt %, or about 24 wt % to 40 wt %, or about 26 wt % to 40 wt %, or about 28 wt % to 40 wt %, or about 30 wt % to 40 wt %, or about 10 wt % to 38 wt %, or about 10 wt % to 36 wt %, or about 10 wt % to 34 wt %, or about 10 wt % to 32 wt %, or about 10 wt % to 30 wt %, or about 10 wt % to 25 wt %, or about 10 wt % to 20 wt %, or about 15 wt % to 35 wt %, or about 20 wt % to 30 wt % based on the total weight of the w/o latex.

Also present in the w/o latex is one or more latex surfactants. Latex surfactants are employed to form and stabilize the w/o latices during polymerization and to maintain latex stability until inversion. Generally the latex surfactant is present at about 20 wt % or less based on the weight of the latex. Conventionally employed surfactants for w/o latices used for EOR applications include nonionic ethoxylated fatty acid esters, ethoxylated sorbitan fatty acid esters, sorbitan esters of fatty acids such as sorbitan monolaurate, sorbitan mono stearate, and sorbitan monooleate, block copolymers of ethylene oxide and hydroxyacids having a $C_{10}$-$C_{30}$ linear or branched hydrocarbon chain, and blends of two or more of these targeted to achieve a selected hydrophilic/lipophilic balance (HLB). Those of skill will understand that a plethora of surfactants are employed throughout the industry to form and stabilize w/o latices, serving as emulsifiers for polymerization of monomers and further maintaining emulsion stability of the polymer formed therein until subsequent use in the field. Any nonionic surfactants and blends thereof conventionally employed in w/o latices for EOR applications are suitably employed in conjunction with the present invention. In embodiments, the latex surfactant is a single nonionic surfactant or blend thereof having a combined HLB value of about 2 to 10, for example about 3 to 10, or about 4 to 10, or about 5 to 10, or about 6 to 10, or about 7 to 10, or about 8 to 10, or about 2 to 9, or about 2 to 8, or about 2 to 7, or about 2 to 6, or about 2 to 5, or about 3 to 9, or about 4 to 8.

Representative amounts of the above listed materials are suitably included in one or more w/o latices useful to stabilize one or more EOR applications, wherein the amounts are suitably selected to provide optimal kinetic stability of the emulsion. In some embodiments, amounts of the above listed materials are suitably employed in one or more w/o latices to form a microemulsion or a nanoemulsion, wherein such emulsions are characterized by one or more properties of thermodynamic stability and optical transparency. Representative amounts of these materials are shown below, wherein these amounts are intended to be representative of the w/o latices useful in conjunction with the methods and materials of the invention. Useful w/o latices are not limited to those shown below. A specific example of a w/o latex formulation is provided in Example 3. Where amounts listed below do not add up to 100 wt %, one or more additional components are also present in the latex.

| Phase | Material | Amount in a w/o Latex, wt % | | | | |
|---|---|---|---|---|---|---|
| | | Latex 1 | Latex 2 | Latex 3 | Latex 4 | Latex 5 |
| Oil | Oil (solvent) | 25 | 30 | 10 | 20 | 25 |
| | Latex Surfactant | 15 | 5 | 3 | 5 | 20 |
| Water | Monomer or Polymer | 50 | 25 | 50 | 35 | 40 |
| | Water | 5 | 40 | 10 | 3 | 10 |

The w/o latices optionally include one or more additives. Salts, buffers, acids, bases, dyes, thermal stabilizers, metal chelators, coalescing solvents, and the like are optionally included in the w/o latices. In some embodiments, the additives include one or more corrosion inhibitors, scale inhibitors, emulsifiers, water clarifiers, hydrogen sulfide scavengers, gas hydrate inhibitors, biocides, pH modifiers, antioxidants, asphaltene inhibitors, or paraffin inhibitors. While the amount of an additive usefully employed in the w/o latex depends on the additive and the intended application, in general the amount of any individual additive is about 0 wt % to 5 wt % based on the total weight of the w/o latex, or about 0 wt % to 4 wt %, or about 0 wt % to 3 wt %, or about 0 wt % to 2 wt %, or about 0 wt % to 1 wt % based on the total weight of the latex.

In embodiments, the w/o latices are made using conventional equipment and methodology. Thus, in embodiments a w/o latex containing the monomers is formed and the polymerization is conducted within the water phase of the latex. In other embodiments the polymer is formed in a water solution, and the solution is used to form a w/o latex. In such embodiments, the w/o latex is formed after polymerization is complete by adding one or more surfactants and one or more oils to the water-based polymer composition and emulsifying the combined components as described above.

In embodiments, the water in the w/o latex is substantially removed after polymerization to produce a more concentrated latex product by distillation, vacuum drying, spray drying, or a combination thereof. In embodiments, the oil in the w/o latex is substantially removed and recycled after polymerization to produce a more concentrated latex product by distillation, vacuum drying, spray drying, or any combination thereof.

Inversion Surfactants

Inversion of the presently disclosed w/o latices is facilitated by an inversion surfactant. Useful inversion surfactants comprise, consist essentially of, or consist of surfactants or blends thereof having an HLB of about 10 to 40, or about 10 to 35, or about 10 to 30, or about 10 to 25, or about 10 to 20, or about 10 to 15, or about 15 to 40, or about 20 to 40, or about 25 to 40, or about 30 to 40, or about 35 to 40, or about 15 to 35, or about 20 to 30. In some embodiments, the inversion surfactant is nonionic and includes one or more compounds comprising one or more ethoxy groups, propoxy groups, or a combination thereof. In some embodiments, the inversion surfactant is ionic and includes one or more carboxylate, sulfonate, phosphate, phosphonate, phosphonium, or ammonium moieties. In some embodiments, the inversion surfactant includes a linear or branched $C_8$-$C_{20}$ hydrocarbyl moiety. In some such embodiments, the inversion surfactant is an alkoxylated alcohol such as an ethoxylated, propoxylated, or ethoxylated/propoxylated alcohol, wherein the alcohol includes a linear or branched $C_8$-$C_{20}$ hydrocarbyl moiety. In some embodiments, the inversion surfactant includes about 4 and 40 ethylene oxide repeat units and 0 to about 10 propylene oxide repeat units. In some embodiments, the inversion surfactant includes a sorbitan moiety. In some embodiments, the inversion surfactant is a block copolymer. In some such embodiments, the block copolymer is linear, branched, or hyperbranched. Examples of suitable inversion surfactants are listed in *McCutcheon's Emulsifiers & Detergents*, MC Publishing Co., 2015 edition.

The inversion surfactant may be added before, concurrently with, or after addition of an inversion agent, described below, to a w/o latex. In embodiments, in order to facilitate inversion of a w/o latex, the inversion surfactant is added to a latex at about 0.1 wt % to 20 wt % based on the total weight of the w/o latex, or about 0.1 wt % to 15 wt %, 0.1 wt % to 10 wt %, or about 0.1 wt % to 7.5 wt %, 0.1 wt % to 6.0 wt % based on the total weight of the w/o latex, or about 0.5 wt % to 5.5 wt %, or about 1.0 wt % to 5.0 wt %, or about 1.5 wt % to 4.5 wt %, or about 2.0 wt % to 4.0 wt %, or about 2.5 wt % to 3.5 wt %, or about 0.1 wt % to 5.5 wt %, or about 0.1 wt % to 5.0 wt %, or about 0.1 wt % to 4.5 wt %, or about 0.1 wt % to 4.0 wt %, or about 0.1 wt % to 3.5 wt %, or about 0.5 wt % to 6.0 wt %, or about 1.0 wt % to 6.0 wt %, or about 1.5 wt % to 6.0 wt %, or about 2.0 wt % to 6.0 wt %, or about 2.5 wt % to 6.0 wt %, or about 3.0 wt % to 6.0 wt %, based on the total weight of the w/o latex.

The amount of inversion surfactant may be reduced when an inversion agent (described below) is added to a w/o latex. In embodiments, an inversion agent is added to a w/o latex and the amount of inversion surfactant is reduced by up to 50% compared to a w/o latex that does not include an inversion agent. In embodiments, the inversion agent is added to a latex at about 0.1 wt % to 10 wt % based on the total weight of the w/o latex, or about 0.1 wt % to 7.5 wt %, 0.1 wt % to 5.0 wt % based on the total weight of the w/o latex, or about 1.5 wt % to 4.5 wt %, or about 2.0 wt % to 4.0 wt %, or about 2.5 wt % to 3.5 wt %, or about 0.1 wt % to 4.5 wt %, or about 0.1 wt % to 4.0 wt %, or about 0.1 wt % to 3.5 wt %, or about 0.5 wt % to 5.0 wt %, or about 1.0 wt % to 5.0 wt %, or about 1.5 wt % to 5.0 wt %, or about 2.0 wt % to 5.0 wt %, or about 2.5 wt % to 5.0 wt %, or about 3.0 wt % to 5.0 wt %, based on the total weight of the w/o latex.

Inversion Agents

We have found inversion agents that when added to conventional w/o latices of water soluble polymers in the presence of an inverting surfactant form invertible latices. The invertible latices are characterized by the rapid and complete inversion thereof under conditions wherein the water source used to invert the latex is about 30° C. to 100° C., or about 40° C. to 100° C., or about 50° C. to 100° C., or about 60° C. to 100° C. Further, the invertible latices are characterized by the rapid and complete inversion thereof under conditions wherein the water source used to invert the latex includes about 0.1 to 30 wt % total dissolved solids. Still further, the invertible latices are characterized by the rapid and complete inversion thereof under conditions wherein the water source used to invert the latex is about 30° C. to 100° C. and further includes about 0.1 to 30 wt % total dissolved solids.

In embodiments, inversion agents of the invention comprise, consist essentially of, or consist of a carbonyl functional compound. As used herein, a carbonyl functional compound is a compound having at least one carboxyl, carboxamide, or hydroxamate group. In some embodiments, the carbonyl compound is a mixture of two or more carbonyl functional compounds.

In embodiments, the carbonyl functional compounds are not surface active agents in w/o latices. That is, they do not tend to lower the surface tension between water and oil phases in a w/o latex. As used herein, a compound that is not a surfactant is one that reduces the surface tension of water in a 0.5% active solution at room temperature by 20% or less, or by 10% or less, or by 5% or less. (Example 9.)

In embodiments, inversion agents of the invention comprise, consist essentially of, or consist of a hydrotrope. As used herein, a hydrotrope is a water soluble compound that solubilizes hydrophobic compounds in an aqueous solution and that includes at least one hydrophilic and at least one minor hydrophobic moiety. As used herein, a minor hydrophobic moiety is one that is insufficient to promote spontaneous self-aggregation or is insufficient to promote accumulation at interfaces or is not a long uninterrupted hydrophobic chain or is any combination of the foregoing. As used herein, a long uninterrupted hydrophobic chain is a hydrocarbyl moiety having 5 or more carbon atoms.

In embodiments, inversion agents of the invention comprise, consist essentially of, or consist of compounds with an HLB as calculated by the Davies formula:

$$HLB=\Sigma(\text{Hydrophilic group contributions})-\Sigma(\text{Hydrophobic group contributions})+7$$

of greater than about 19, or greater than about 20, or greater than about 25, or greater than about 30, or greater than about 35, or greater than about 40, or about 20 to 150, or about 20 to 140, or about 20 to 130, or about 20 to 120, or about 20 to 110, or about 20 to 100, or about 20 to 90, or about 20 to 80, or about 20 to 70, or about 20 to 60, or about 20 to 50, or about 25 to 150, or about 30 to 150, or about 35 to 150, or about 40 to 150, or about 45 to 150.

Examples of carbonyl functional inversion agents comprise, consist essentially of, or consist of hydroxycarboxylic acids or salts thereof, hydroxyamides, and amino acids. Examples of hydroxycarboxylic acids or salts thereof include carboxymethyl polyol ethers having at least 4 carbon atoms, such as carboxymethyl-1,2-diol, carboxymethyl glycerol, carboxymethyl erythritol, carboxymethyl sorbitol, and carboxymethyl polyglycerol; α-hydroxyacids such as glycolic acid, lactic acid, tartaric acid, and malic acid; and β-hydroxyacids such as hydroxypropionic acid, carnitine, and salicylic acid. Carboxymethyl polyols may be synthesized according to Examples 1 and 2. Examples of hydroxyamides include N-hydroxysuccinimide. Examples of amino acids include glycine, alanine, lysine, serine, and threonine.

Unexpectedly, the inversion agent, or the inversion agent in combination with the inversion surfactant, reduces the bulk viscosity of the invertible latex. In embodiments, reduced bulk viscosity provides better pumpability for pumping and transferring the invertible latex and/or the polymer flooding solution. The inversion agent, or the inversion agent in combination with the inversion surfactant, may increase the speed of the inversion process, increase the completeness of the inversion process, or both increase the speed and completeness. The resulting polymer flooding solution may thereby demonstrate improved performance.

In embodiments, the inversion agents, or the inversion agents in combination with an inversion surfactant, of the present disclosure facilitate inversion of an invertible latex compared to an invertible latex comprising no inversion agent and/or compared to an invertible latex comprising a known inversion agent such as glycerol. The inversion agents, or the inversion agents in combination with an inversion surfactant, of the present disclosure increase the speed and/or completeness of the inversion process compared to an invertible latex comprising no inversion agent and/or compared to an invertible latex comprising a known inversion agent such as glycerol.

In embodiments, the inversion agents, or the inversion agents in combination with an inversion surfactant, facilitate inversion of an invertible latex under conditions wherein the water source used to invert the latex is about 0° C. to 100° C. In some examples, the inversion agents, or the inversion agents in combination with an inversion surfactant, facilitate inversion of an invertible latex under conditions wherein the water source used to invert the latex is about 4° C., about 25° C., or about 60° C. (Examples 7 and 8.)

In embodiments, the inversion agents, or the inversion agents in combination with an inversion surfactant, facilitate inversion of an invertible latex under conditions wherein the water source used to invert the latex includes about 0.1 to 30 wt % total dissolved solids. In some examples, the inversion agents, or the inversion agents in combination with an inversion surfactant, facilitate inversion of an invertible latex under conditions wherein the water source used to invert the latex includes about 3.5% total dissolved solids. (Examples 7 and 8.)

In embodiments, the inversion agents, or the inversion agents in combination with an inversion surfactant, facilitate inversion of an invertible latex under conditions wherein the water source used to invert the latex is about 0° C. to 100° C. and includes about 0.1 to 30 wt % total dissolved solids. In some examples, the inversion agents, or the inversion agents in combination with an inversion surfactant, facilitate inversion of an invertible latex under conditions wherein the water source used to invert the latex is about 4° C., about 25° C., or about 60° C. and includes about 3.5% total dissolved solids. (Examples 7 and 8.)

Without being limited to any mechanism or mode of action, inversion agents may form hydrogen bonds and/or may affect the osmotic pressure of monomer- or polymer-comprising droplets of the discontinuous internal water phase within the continuous oil phase of a w/o latex. The inversion agents may increase the osmotic pressure of the droplets such that the droplets swell. When combined with a water source to form a polymer flooding solution, the swollen droplets may rupture more easily, facilitating the release of the monomer or polymer into the water. Separately from, or in addition to, the effect on osmotic pressure, the inversion agents may chelate ions within the droplets. Chelation may prevent or limit interaction of ions with the surfactant and thereby facilitate inversion. In embodiments, the branched structure of some inversion agents, such as carboxymethyl polyglycerols, may facilitate inversion compared to the inclusion of straight chain molecules.

In embodiments, the inversion agent is added to a latex in an amount sufficient to facilitate the inversion of a w/o latex. The amount is not so high that it causes the emulsion to break or otherwise be unstable. In embodiments, the inversion agent is added to a latex in an amount less than amounts of known inversion agents. For example, the presently disclosed inversion agent may be added in an amount of from about 0.1 wt % to 5.0 wt % based on the total weight of the w/o latex. In contrast, and as disclosed in US 2014/0051620, glycerol is preferably added in an amount of from about 5 to about 20% by weight.

In embodiments, in order to facilitate inversion of a w/o latex, the inversion agent is added to a latex at about 0.1 wt % to 20.0 wt % based on the total weight of the w/o latex, or about 0.1 wt % to 15.0 wt %, or about 0.1 wt % to 10.0 wt %, or about 0.1 wt % to 7.5 wt %, or about 0.1 wt % to 5.0 wt %, or about 0.5 wt % to 4.5 wt %, or about 1.0 wt % to 4.0 wt %, or about 1.5 wt % to 3.5 wt %, or about 2.0 wt % to 3.0 wt %, or about 0.1 wt % to 4.5 wt %, or about 0.1 wt % to 4.0 wt %, or about 0.1 wt % to 3.5 wt %, or about 0.1 wt % to 3.0 wt %, or about 0.5 wt % to 5.0 wt %, or about 1.0 wt % to 5.0 wt %, or about 1.5 wt % to 5.0 wt %, or about 2.0 wt % to 5.0 wt %, based on the total weight of the w/o latex.

The inversion agent is added to a latex at an inversion surfactant:inversion agent wt:wt ratio of about 10:1, or about 7.5:1, or about 5:1, or about 2.5:1, or about 2:1, or about 1.75:1, or about 1.5:1, or about 1.25:1, or about 1:1, or about 1:10, or about 1:7.5, or about 1:5, or about 1:2.5, or about 1:2, or about 1:1.75, or about 1:1.5, or about 1:1.25.

The inversion surfactant and inversion agent are added to a latex in a combined amount ([inversion surfactant+inversion agent]) of about 0.1 wt % to 20.0 wt % based on the total weight of the w/o latex, or about 0.5 wt % to 18.0 wt %, or about 1.0 wt % to 16.0 wt %, or about 1.5 wt % to 14.0 wt %, or about 2.0 wt % to 12.0 wt %, or about 2.5 wt % to 10.0 wt %, or about 3.0 wt % to 8.0 wt %, or about 3.5 wt % to 7.5 wt %, or about 4.0 wt % to 7.0 wt %, or about 4.5 wt % to 6.5 wt %, or about 0.1 wt % to 18.0 wt %, or about 0.1 wt % to 16.0 wt %, or about 0.1 wt % to 14.0 wt %, or about 0.1 wt % to 12.0 wt %, or about 0.1 wt % to 10.0 wt %, or about 0.1 wt % to 8.0 wt %, or about 0.1 wt % to 7.5 wt %, or about 0.1 wt % to 7.0 wt %, or about 0.1 wt % to 6.5 wt %, or about 0.5 wt % to 20.0 wt %, or about 1.0 wt % to 20.0 wt %, or about 1.5 wt % to 20.0 wt %, or about 2.0 wt % to 20.0 wt %, or about 2.5 wt % to 20.0 wt %, or about 3.0 wt % to 20.0 wt %, or about 3.5 wt % to 20.0 wt %, or about 4.0 wt % to 20.0 wt %, or about 4.5 wt % to 20.0 wt %, or about 5.0 wt % to 20.0 wt %, or about 5.5 wt % to 20.0 wt %, or about 6.0 wt % to 20.0 wt %, or about 6.5 wt % to 20.0 wt %, or about 7.0 wt % to 20.0 wt %, or about 7.5 wt % to 20.0 wt %, or about 8.0 wt % to 20.0 wt %, based on the total weight of the w/o latex.

Invertible Latices

Addition of an inversion agent of the present disclosure to a conventional w/o latex in the presence of an inverting surfactant, results in an invertible latex of the invention. The inversion agents may be added to the w/o latex before or after polymerization. The inversion agents may be added to a w/o latex before or after addition of an inverting surfactant. In some embodiments, the inversion agents are characterized as not being surfactants, that is, they are not surface active. Thus, in some embodiments, the invertible latices of the invention comprise, consist essentially of, or consist of a conventional w/o latex as described above, an inversion surfactant, and an inversion agent. In embodiments, the inversion agent is added to the w/o latex before polymerizing the monomer via a conventional free-radical or redox initiation. In other embodiments, the inversion agent is added directly to the w/o latex after polymerization is complete.

The invertible latices of the invention are stable or even shelf stable. That is, the invertible latices do not exhibit any observed signs of gross phase separation, coagulation, or precipitation for at least 24 hours at ambient laboratory temperatures. In embodiments, the invertible latex is stable under common ambient conditions for at least 1 day at 20° C.-25° C., or for at least 2 days at 20° C.-25° C., or for at least 1 week at 20° C.-25° C., or for at least 2 weeks at 20° C.-25° C., or for at least 1 month at 20° C.-25° C., or for at least 2 months at 20° C.-25° C., or for at least 1 day at 50° C., or for at least 2 days at 50° C., or for at least 5 days at 50° C., or for at least 10 days at 50° C., or for at least 30 days at 50° C.

Inversion of the Invertible Latices

The invertible latices of the invention invert rapidly and completely when contacted with a water source having high temperature, high total dissolved solids, or both to yield a polymer flooding solution. Numerous advantages are realized by use of the invertible latices of the invention; principal of these is the time savings realized when rapid and complete inversion replaces multi-step, slow, or incomplete inversion in the field. Both the invertible latices and the resulting polymer flooding solutions are characterized by the absence of the manifestations of latex or inversion instability; avoiding latex or inversion instability prevents downtime in the field necessitated by plugged or fouled equipment and avoids damages to reservoirs and plugging the formation.

During inversion, a water source is contacted with an invertible latex in one or more steps including one or more mixing and/or shearing processes to result in a polymer flooding solution having 1 wt % polymer or less. In some embodiments, the invertible latices of the invention provide for a simple, one-step inversion process characterized by absence of instabilities manifested as coagulation or precipitation of polymer or gross phase separation of the water phase from the oil phase prior to dissolution. It is a feature of the invention that the invertible latices of the invention provide for a simple, one-step inversion process in the presence of water sources contacted with the invertible latex at temperatures of about 30° C. to 100° C., or about 40° C. to 100° C., or about 50° C. to 100° C., or about 60° C. to 100° C. It is a feature of the invention that the invertible latices of the invention provide for a simple, one-step inversion process in the presence of water sources contacted with the invertible latex wherein the water source contacting the invertible latex includes about 0.1 to 30 wt % total dissolved solids. It is a feature of the invention that the invertible latices of the invention provide for a simple, one-step inversion process wherein the water source contacting the invertible latex includes about 0.1 to 30 wt % total dissolved solids and further contacts the inversion composition at about 30° C. to 100° C.

During the inversion process, the presence of the inversion agent reduces or prevents the coagulation of the polymer in the polymer flooding solution; reduces or prevents "hardening" or "raincycle" (evaporation, condensation) during storage that leads to formation of viscous masses on the surface and in the bulk; and prevents formation of lumps, skin, crust, or "waxing" due to the sensitivity of the invertible latex to shear during the pumping, filtration and stirring steps to which the latices are subjected in EOR applications, which in turn leads to the breakage of the mechanical seals of the pumps or the plugging of the filters, valves and check valves.

The polymer flooding solution typically includes about 1 wt % or less of polymer, other (residual) compounds from the inverted latex, and any dissolved solids present in the water source. The polymer flooding solutions of the invention are characterized by absence of gel particles, absence of gross phase separation, and/or absence other manifestations of inversion instability of w/o latices.

Inversion of the invertible latices to form the polymer flooding solutions is accomplished using conventional techniques and equipment, which is an unexpected benefit of employing the inversion agent of the invention using water sources that are high temperature, high total dissolved solids, or both high temperature/high total dissolved solids water sources. In some embodiments, inversion of invertible latices to form the polymer flooding solutions is suitably accomplished in a single step including dilution and mixing of the invertible latex with the water source to the target polymer concentration in the polymer flooding solution. In other embodiments, inversion of invertible latices to form the polymer flooding solutions is suitably accomplished in two dilution/mixing steps to reach the target polymer concentration. In some embodiments, the inversion and dilution to a target concentration of less than 1 wt % is accomplished in about 1 to 15 minutes, for example about 1 to 14, 1 to 13, 1 to 12, 1 to 11, 1 to 10, 1 to 9, 1 to 8, 1 to 7, 1 to 6, 1 to 5, 2 to 15, 3 to 15, 4 to 15, 5 to 15, 6 to 15, 7 to 15, 8 to 15, 9 to 15, 10 to 15, 2 to 10, 2 to 9, 2 to 8, 3 to 10, 3 to 9, 3 to 8, 4 to 10, 4 to 9, 4 to 8, or 4 to 7 minutes.

After inversion, the polymer flooding solutions comprise about 100 ppm to 10,000 ppm (0.01 wt % to 1.00 wt %) polymer, or about 200 ppm to 5000 ppm, or about 200 ppm to 4000 ppm, or about 200 ppm to 3000 ppm, or about 200 ppm to 2500 ppm polymer. In some embodiments the water source contacts the invertible latex at a temperature of about 30° C. to 100° C., or about 40° C. to 100° C., or about 50° C. to 100° C., or about 60° C. to 100° C. In other embodiments, the water source includes about 0.1 to 30 wt % total dissolved solids. In still other embodiments, the water source includes about 0.1 to 30 wt % total dissolved solids and further contacts the inversion composition at about 30° C. to 100° C.

A water source is water or a water solution having up to about 30.0 wt % total dissolved solids (TDS), or about 0.1 wt % to 29.0 wt %, or about 0.5 wt % to 28.0 wt %, or about 1.0 wt % to 27.0 wt %, or about 2.0 wt % to 25.0 wt %, or about 3.0 wt % to 20.0 wt % TDS. "High TDS" water sources have TDS of at least about 1 wt %. Thus in embodiments a water source includes one or more dissolved solid materials including but not limited to salts, ions, buffers, acids, bases, surfactants, compounds employed in the water used in mining operations, or other dissolved, dispersed, or emulsified compounds, materials, components, or combinations thereof. Nonlimiting examples of water sources include hard water, produced water from mining operations, brackish water, sea water, municipal waste water, tap water, "gray water", and the like. Water sources having high TDS and high temperature are often encountered in use for EOR applications. For example, hydraulic fracturing and conventional oil recovery often results in produced water having high TDS, temperatures in excess of 60° C., or both; rather than use fresh water, in such situations it is economical to reuse the produced water as the water source for inversion processes.

In some embodiments, the method of inverting the invertible latices involves conventional inverting equipment. While inverting a latex is often accomplished in the field using high shear, stepwise dilution for efficiency in achieving full dilution and hydration of a polymer at the desired use level, we have found that relatively low shear mixing is advantageous in some embodiments for inverting the invertible latices of the invention. Such techniques are advantageous because avoiding some or all shear on the polymer chains during dissolution results in a higher final viscosity of the polymer flooding solution by reducing or eliminating chain scission of the high molecular weight polymers. It is a feature of the invertible latices of the invention that low-shear techniques that avoid substantial amounts of chain scission are suitably used in rapid inversion to result in polymer flooding solutions characterized by lack of manifestations of instability as discussed above.

Low shear inverting equipment employed to invert the invertible latices of the invention include static mixers. For example, U.S. Pat. No. 8,383,560 describes an apparatus employing a two-step inversion apparatus. In the first step, a w/o polymer latex is diluted to yield a polymer solution having about 5000 ppm to 20,000 ppm polymer solids employing a first static mixer having a pressure drop of at least 2 bars between the inlet and outlet thereof. In the second step, the partially diluted latex is applied to a second static mixer having a pressure drop of at least 1 bar between the inlet and outlet, and is further diluted to result in a polymer solution having between 500 and 3000 ppm, in practice between 1000 and 2000 ppm polymer solids. Such a two-step dilution system is usefully employed in conjunction with the invertible latices of the present invention. Conventional static mixers, as described in U.S. Pat. No. 8,383,560 are usefully employed; other low shear mixers and pumps are used in addition to, or as a replacement for, one or more static mixers described in U.S. Pat. No. 8,383, 560.

Unexpectedly, we have further found that it is possible to employ a single stage inversion of the invertible latices by employing the inversion agents of the invention: that is, a single dilution step with a water source is usefully employed to dilute the invertible latices to form a polymer flooding solution at the final use concentration of about 100 ppm to 10,000 ppm. No intermediate or step-down dilution is required to form the polymer flooding solution. The polymer flooding solutions of the invention are characterized by the substantial absence of gels and solution instabilities in the field. This finding is significant because conventional w/o latices, subjected to a single dilution step in the field, result in substantial gel particles and/or solution instabilities that cause plating out or plugging of equipment used to carry out EOR by polymer flooding. Conventional water-in-oil EOR latices require two or more dilution steps and several hours to complete inversion to result in a polymer solution.

In some embodiments, after the invertible latices are contacted with water source to form a polymer flooding solution in a single dilution step, the polymer continues to build viscosity for about 0.5 minute to 120 minutes, or about 0.75 minute to 115 minutes, or about 1 minute to 110 minutes, or about 2 minutes to 105 minutes, or about 5 minutes to 100 minutes, or about 10 minutes to 90 minutes, or about 15 minutes to 80 minutes, or about 5 minutes to 70 minutes, or about 10 minutes to 70 minutes, or about 20 minutes to 70 minutes, or about 30 minutes to 70 minutes, or about 40 minutes to 70 minutes, or about 50 minutes to 70 minutes, or about 5 minutes to 60 minutes, or about 10 minutes to 60 minutes, or about 20 minutes to 60 minutes, or about 30 minutes to 60 minutes, or about 40 minutes to 60 minutes.

The inverted w/o latices, that is, the polymer flooding solutions of the invention, are characterized by a substantial freedom from gel particles and subsequent final polymer solution instability. The test for gel particle formation consists of measuring the time taken to filter given masses of solution containing 1000 ppm (0.1 wt %) polymer. The solution is contained in a steel bell filter ratio housing pressurized to and maintained at 20 psi. The filter has a diameter of 90 mm and a pore size of 5 microns.

The times required to obtain 90 g (t90 g); 120 g (t120 g); 180 g (t180 g) and 210 g (t210 g) of filtrate are therefore measured and a filtration quotient (or filter ratio denoted "FR") is defined, expressed as:

$$FR = \frac{t210 \text{ g} - t180 \text{ g}}{t120 \text{ g} - t90 \text{ g}}$$

The time measurement accuracy is 0.1 second.

The FR thus represents the capacity of the polymer solution to plug the filter for two equivalent consecutive mass samples. A typical acceptability criterion of the industry is FR<1.5. Conventional w/o latices employed for formation of polymer flooding solutions cannot achieve this level of filterability even after several hours of stirring in the laboratory. However, the invertible latices of the invention are characterized in that FR<1.5 is suitably achieved in about 5 minutes or less when a water source is contacted with a invertible latex of the invention, for example about 1 to 5 minutes, or about 2 to 5 minutes, or about 3 to 5 minutes, or about 4 to 5 minutes, or about 1 to 4 minutes, or about 1 to 3 minutes.

In a nonlimiting example of an EOR application, a w/o latex is applied to a reservoir as follows. An invertible latex is introduced to a mixing apparatus, wherein a water source is contemporaneously introduced into the apparatus in an amount suitable to form a polymer solution of the desired concentration. A water source, such as a high temperature water source, a high total dissolved solids water source, or a high temperature/high total dissolved solids water source is added to the invertible latex in an amount suitable to target the selected final polymer concentration. The water source is added prior to or contemporaneously with the carrying out of one or more mixing processes to thoroughly mix the invertible latex with the water source and accomplish the inversion.

In some embodiments, inversion of the invertible latices is suitably carried out using conventional equipment and methods used to invert latices in the field. Employing conventional equipment and methods familiar to those of skill in inverting w/o latices for EOR applications, it is possible to invert the invertible latex in less than 5 minutes, for example about 1 second to 5 minutes, or about 20 seconds to 5 minutes, or about 30 seconds to 5 minutes, or about 1 minute to 5 minutes, or about 2 minutes to 5 minutes, or about 1 second to 4 minutes, or about 1 second to 3 minutes, or about 1 second to 2 minutes, or about 1 second to 1 minute.

In some embodiments, inversion is suitably carried out by subjecting the invertible latices of the invention to a single-step inversion by diluting the latices with a water source and efficiently mixing the water source and the invertible latex in a single step. Devices suitable to achieve a one-step inversion include static mixers, paddle or blade mixers, mixing pumps, and the like. Any devices conventionally employed for w/o latex inversion are suitably employed to invert the invertible latices of the invention.

While the foregoing description is centered on EOR applications, water soluble polymers and latices thereof are also usefully employed in one or more papermaking applications using a Fourdrinier or inclined Fourdrinier apparatus, wherein water-based furnishes dispensed onto a wire can include an EOR-type polymer to improve the rheological profile of the furnish as dictated by machine or application parameters. In such applications, the invertible latices of the invention are advantageously employed due to rapid inversion upon addition to a furnish (a water-based dispersion of fibers) to result in a polymer solution similar to the polymer flooding solutions as described above. In papermaking applications, it is desirable to use tap water or another water-based solution to form the furnish and the w/o latices of the invention are suitable for use with water-based furnishes employing water-based solutions having high TDS, at elevated temperatures, or both. Papermaking includes making paper—that is, cellulose based mats—as well as other nonwoven fibrous mats such as filtration media that employ e.g. thermoplastic and glass fibers in addition to or instead of cellulose based fibers. One of skill will appreciate that other industrial uses, such as in wastewater treatment, mining services, or energy services, of the w/o latices of the invention are similarly envisioned.

EXAMPLES

Abbreviations

CMPG—Carboxymethyl polyglycerol
CMG—Carboxymethyl glycerol
NHSI—N-hydroxysuccinimide Example 1

Carboxymethyl glycerol used in the following examples was synthesized by adding 37.00 g of glycerol to a round bottom flask, followed by addition of 80.36 g of 50% NaOH with agitation. After mixing for 15 minutes at ambient temperature, 175.86 g of sodium chloroacetate were added to the mixture slowly while mixing, and the resulting mixture was mixed for at least 1 hour until the carboxymethylation reaction was completed. The product was neutralized with sulfuric acid prior to the invertibility analysis of Example 6.

Example 2

Carboxymethyl polyglycerols used in the following examples were synthesized according to the procedure of Example 1 with the following modifications. Branched polyglycerols were synthesized according to the procedure described in U.S. Patent Application Publication No. 2011/0092743 A1, which is incorporated by reference herein in its entirety. Thus, 64.28 g of a branched polyglycerol was dissolved in 19.28 g of deionized water. 23.32 g of 50% NaOH and 28.30 g of sodium chloroacetate were used for the carboxymethylation reaction.

Example 3

Water-in-oil latices were prepared using the components of Table 1.

TABLE 1

Components of w/o latices.

| Material | Wt % |
|---|---|
| Water Phase | |
| Acrylamide 49.5% | 38.2953 |
| DI water | 15.0941 |
| Acrylic acid | 7.6437 |
| Sodium hydroxide | 8.2524 |
| Sodium formate | 0.0340 |
| VERSENEX ® 80 (pentasodium diethylenetriaminepentaacetate) | 0.0300 |

TABLE 1-continued

Components of w/o latices.

| Material | Wt % |
|---|---|
| Oil Phase | |
| Hydrocarbon solvent (hydrotreated light distillate) | 27.1845 |
| Sorbitan sesquioleate (Span 83 ™ or Arlacel 83 ™, Croda International PLC, Yorkshire, United Kingdom) | 0.8234 |
| Polyoxyethylene (40-50) sorbitol hexaoleate | 2.5747 |
| HYPERMER ® B210 (Croda International PLC, Yorkshire, United Kingdom) | 0.0194 |
| Initiator | |
| 2,2'-azobisisobutyronitrile | 0.0288 |
| Post treatment/reduction of acrylamide residual | |
| TBHP (tertiary butyl hydroperoxide) 70% | 0.0064 |
| Sodium metabisulfite | 0.0133 |

Polymerization of the components of Table 1 was conducted at 38° C. to 44° C. for 3 to 4 hours and post heated for 57° C. for 30 minutes. The latex polymer (an acrylic acid and acrylamide copolymer) was then agitated at 800 rpm using a cage stirrer at room temperature. A carbonyl functional inversion agent (2-3 wt %, neutralized to pH 7), then a stabilizer (ammonium thiocyanate, 0.125%), and then an inverting surfactant (tridecyl alcohol ethoxylate (TDA-12; ethoxylated C11-14-ISO-, C13-rich alcohol; T-DET® A 1312; Harcros, Kansas City, Kans.), 3.3%) were added with agitation. Control latices did not include an inversion agent. The resulting blend was stirred at room temperature for 30 minutes to produce a w/o latex for the invertibility analysis of Example 7.

Example 4

The stability of the w/o latices produced in Example 3 was evaluated and stability data is presented in Table 2. Stability was assessed by allowing the latices to stand at ambient laboratory temperatures for the indicated amount of time, and the amount of oil phase that separates from the latex (oil split) was observed as an indication of latex stability; the bulk viscosity (BV) of the lattices was also measured before and after standing.

TABLE 2

Stability data of the w/o latices of Example 3.

| Inversion Agent (3 wt %) | Oil Split (%) | Latex BV (initial, cP) | Latex BV (Final, cP) | Aging Time |
|---|---|---|---|---|
| Lactic acid | 7.46 | 824 | 900 | 2.5 months |
| Malic acid | 4.54 | 840 | 956 | 2.5 months |

The stability data presented in Table 2 demonstrates that w/o latices comprising α-hydroxy carboxylic acid inversion agents remained stable after 2.5 months. The oil split was low and no significant change in the latex BV was observed.

Example 5

Water-in-oil latices were prepared using the components of Table 3.

TABLE 3

Components of w/o latices.

| Material | Wt % |
|---|---|
| Acrylamide 49.5% | 38.2953 |
| DI water | 13.1717 |
| Acrylic acid | 7.6437 |
| Sodium hydroxide 50% | 8.3457 |
| Sodium formate | 0.0340 |
| Glyoxal 40% | 0.0117 |
| VERSENEX ® 80 (pentasodium diethylenetriaminepentaacetate) | 0.0300 |
| Hydrocarbon solvent (hydrotreated light distillate) | 29.0000 |
| Sorbitan sesquioleate | 0.8892 |
| Polyoxyethylene (40-50) sorbitol hexaoleate | 2.5108 |
| HYPERMER ® B210 (Croda International PLC, Yorkshire, United Kingdom) | 0.0194 |
| 2,2'-azobisisobutyronitrile | 0.0288 |
| TBHP (tert-butyl hydroperoxide) 70% | 0.0064 |
| Sodium metabisulfite | 0.0133 |

The w/o latices were prepared as in Example 3. The stability of the w/o latices was evaluated and stability data is presented in Table 4. Stability was assessed by placing the latices in a 50° C. oven for 4.5 months, and the amount of oil phase that separates from the latex (oil split) was observed as an indication of latex stability; the bulk viscosity (BV) of the lattices was also measured before and after standing.

TABLE 4

Stability data of the w/o latices of Table 3.

| Inversion Agent (2 wt %) | Inversion Agent (1 wt %) | Oil Split (%) | Latex BV (initial, cP) | Latex BV (Final, cP) |
|---|---|---|---|---|
| Carboxymethyl polyglycerol 2 | Lactic acid | 19.05 | 816 | 1156 |
| Polyglycerol 2 | Lactic acid | 14.63 | 812 | 988 |

The stability data presented in Table 4 demonstrates that w/o latices comprising carbonyl functional inversion agents remained stable after 4.5 months.

Example 6

The bulk viscosity (BV) of each of the w/o latices produced in Example 3 was measured at room temperature using a Brookfield DV-E viscometer.

Example 6A

BV data for w/o latices comprising 3 wt % of a carbonyl functional inversion agent are presented in Table 5.

TABLE 5

Bulk viscosity (BV) data of w/o latices of Example 3 comprising 3 wt % of a carbonyl functional inversion agent.

| Inversion Agent (3 wt %) | MW of polyglycerols (Da) | BV (cps) |
|---|---|---|
| None (Control) | N/A | 2432 |
| Glycerol | N/A | 2152 |
| Carboxymethyl polyglycerol 1 | 260 | 1892 |

TABLE 5-continued

Bulk viscosity (BV) data of w/o latices of Example 3 comprising 3 wt % of a carbonyl functional inversion agent.

| Inversion Agent (3 wt %) | MW of polyglycerols (Da) | BV (cps) |
|---|---|---|
| Carboxymethyl polyglycerol 2 | 960 | 1736 |
| Carboxymethyl glycerol | N/A | 780 |

The data of Table 5 demonstrate that the w/o latices of Example 3 comprising 3 wt % of a carbonyl functional inversion agent had bulk viscosities lower than w/o latices comprising no inversion agent (control SC latices) and lower than w/o latices comprising 3 wt % glycerol. The inclusion of a carbonyl functional inversion agent in w/o latices decreased bulk viscosity 22% to 68% over control latices and 12% to 64% over w/o latices comprising glycerol. The inclusion of 3 wt % glycerol in w/o latices had a negligible effect on bulk viscosity. The lower BVs of the w/o latices comprising a carbonyl functional inversion agent provide better pumpability for pumping and transferring the invertible latices.

Example 6B

BV data for w/o latices comprising 3 wt % of a carbonyl functional inversion agent are presented in Table 6.

TABLE 6

Bulk viscosity data of w/o latices of Example 3 comprising 3 wt % of a carbonyl functional inversion agent.

| Inversion Agent (3 wt %) | BV (cps) |
|---|---|
| None (Control) | 2432 |
| Glycerol | 2152 |
| Glycolic acid | 1292 |
| Lactic acid | 824 |
| Malic acid | 840 |

The data of Table 6 demonstrate that the w/o latices of Example 3 comprising 3 wt % of a carbonyl functional inversion agent have bulk viscosities lower than w/o latices comprising no inversion agent (control w/o latices) and lower than w/o latices comprising 3 wt % glycerol. The inclusion of a carbonyl functional inversion agent in w/o latices decreased bulk viscosity 47% to 66% over control latices and 40% to 62% over w/o latices comprising glycerol. The inclusion of 3 wt % glycerol in w/o latices had a negligible effect on bulk viscosity. The lower BVs of the w/o latices comprising a carbonyl functional inversion agent provide better pumpability for pumping and transferring the invertible latices.

Example 6C

BV data for w/o latices comprising 3 wt % of an carbonyl functional inversion agent are presented in Table 7.

TABLE 7

Bulk viscosity data of w/o latices of Example 3 comprising 3 wt % of an carbonyl functional inversion agent.

| Inversion Agent (3 wt %) | BV (cps) |
|---|---|
| None (Control) | 2432 |
| Glycerol | 2152 |

TABLE 7-continued

Bulk viscosity data of w/o latices of Example 3 comprising 3 wt % of an carbonyl functional inversion agent.

| Inversion Agent (3 wt %) | BV (cps) |
|---|---|
| N-hydroxysuccinimide | 1656 |
| Glycine | 2048 |

The data of Table 7 demonstrate that the w/o latices of Example 3 comprising 3 wt % of an carbonyl functional inversion agent have bulk viscosities lower than w/o latices comprising no inversion agent (control w/o latices) and lower than w/o latices comprising 3 wt % glycerol. The inclusion of a carbonyl functional inversion agent in w/o latices decreased bulk viscosity 16% to 32% over control latices and 5% to 23% over w/o latices comprising glycerol. The inclusion of 3 wt % glycerol in w/o latices had a negligible effect on bulk viscosity. The lower BVs of the w/o latices comprising an carbonyl functional inversion agent provide better pumpability for pumping and transferring the invertible latices.

Example 6D

BV data for w/o latices of Example 3 comprising 2 wt % of a carbonyl functional inversion agent are presented in Table 8.

TABLE 8

Bulk viscosity data of w/o latices of Example 3 comprising 2 wt % of a carbonyl functional inversion agent.

| Inversion Agent (2 wt %) | MW of polyglycerols (Da) | BV (cps) |
|---|---|---|
| None (Control) | N/A | 2432 |
| Glycerol | N/A | 2084 |
| Carboxymethyl polyglycerol 1 | 260 | 840 |
| Carboxymethyl polyglycerol 2 | 960 | 780 |
| Carboxymethyl glycerol | N/A | 544 |
| Lactic acid | N/A | 890 |

The data of Table 8 demonstrate that the w/o latices of Example 3 comprising 2 wt % of a carbonyl functional inversion agent have bulk viscosities lower than w/o latices comprising no inversion agent (control w/o latices) and lower than w/o latices comprising 2 wt % glycerol. The inclusion of a carbonyl functional inversion agent in w/o latices decreased bulk viscosity from 63% to 78% over control latices and from 57% to 74% over w/o latices comprising glycerol. The inclusion of 2 wt % glycerol in w/o latices had no effect on bulk viscosity. The lower BVs of the w/o latices comprising a carbonyl functional inversion agent provide better pumpability for pumping and transferring the invertible latices.

Example 7

The invertibility of the w/o latices of Example 3 was determined by torque monitor technique. A torque monitor is a qualitative analytical tool comprising a DC stir motor, a controller that can report the torque (DC voltage) required to maintain a constant stir speed, and a computer to record the torque reading as a function of time. In a typical experiment, the w/o latex was added to a stirring solution of 3.5% synthetic sea water (Glas-Col Precision Stirrer, obtained from Glas-Col LLC of Terre Haute, Ind.), and the generated torque was monitored as a function of time ([polymer]

=10000 ppm, 400 rpm). The analysis was run for 20-30 min to confirm the torque remained stable. Experiments were conducted at 60° C. with high salinity conditions to evaluate the performance of w/o latices under high stress conditions.

The 3.5% synthetic seawater used in the present Example was formed by blending the components of Table 9.

TABLE 9

Components of 3.5% synthetic seawater.

| Reagent | Amount (g) |
|---|---|
| Deionized water | 957.99 |
| Sodium bicarbonate (NaHCO$_3$) | 0.01 |
| Calcium chloride CaCl$_2$•2H$_2$O | 1.57 |
| Sodium sulfate (Na$_2$SO$_4$) | 4.38 |
| Magnesium chloride (MgCl$_2$•6H$_2$O) | 11.39 |
| Sodium chloride (NaCl) | 24.65 |

Example 7A

Figure 1:
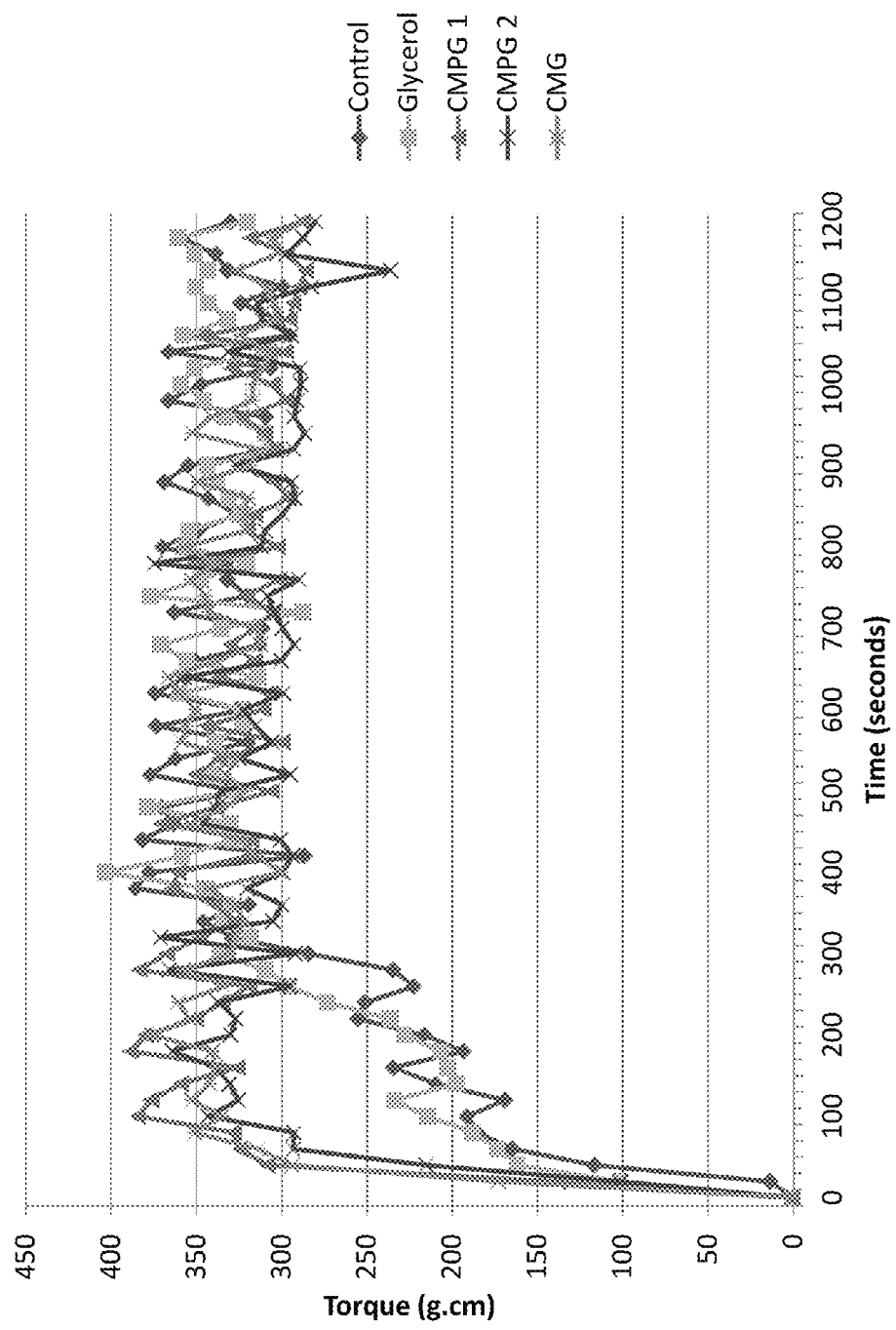
FIG. 1 is a line graph of torque monitor data at 60° C. showing the invertibility of w/o latices comprising 3 wt % of a carbonyl functional inversion agent and 3.3% of TDA-12 as an inverting surfactant ([polymer]=10000 ppm in 3.5% SSW).

Torque data at 60° C. for w/o latices comprising 3 wt % of a carbonyl functional inversion agent are presented in Table 10 and FIG. 1.

TABLE 10

Torque data at 60° C. of w/o latices of Example 3 comprising 3 wt % of a carbonyl functional inversion agent.

| | Torque (g · cm) | | | | |
|---|---|---|---|---|---|
| Time (sec) | Control | Glycerol | CMPG 1 | CMPG 2 | CMG |
| 0 | −0.3713 | 0.5544 | 1.1800 | 0.1170 | 0.7019 |
| 20 | 13.7685 | 101.3641 | 138.2039 | 101.6388 | 172.8210 |
| 40 | 116.7145 | 162.0941 | 308.3903 | 215.3676 | 293.8741 |
| 60 | 164.8305 | 173.2839 | 324.6663 | 293.2892 | 314.1174 |
| 80 | 185.1756 | 187.7289 | 328.1250 | 292.6788 | 351.0437 |
| 100 | 191.3808 | 214.5844 | 384.4808 | 343.0328 | 335.0728 |
| 120 | 169.1030 | 234.2173 | 376.5462 | 325.3326 | 352.6713 |
| 140 | 209.6914 | 197.4945 | 359.0495 | 330.5206 | 342.3971 |
| 160 | 234.4106 | 202.4790 | 326.0905 | 338.8621 | 339.4470 |
| 180 | 193.4153 | 206.8532 | 388.4481 | 363.9882 | 340.6677 |
| 200 | 216.6087 | 227.8086 | 379.6997 | 330.0120 | 376.0681 |
| 220 | 255.1626 | 236.2518 | 350.1994 | 326.8585 | 354.2989 |
| 240 | 250.9918 | 273.1781 | 335.0423 | 337.2345 | 360.5042 |
| 260 | 222.6105 | 295.9646 | 318.9697 | 295.1202 | 333.2418 |
| 280 | 234.8175 | 309.6975 | 383.5653 | 365.8193 | 357.9610 |
| 300 | 284.1543 | 336.4512 | 366.9840 | 292.1702 | 329.9866 |
| 320 | 329.1168 | 318.1407 | 347.8597 | 371.0073 | 326.8331 |
| 340 | 346.0032 | 334.3150 | 326.9043 | 305.0893 | 321.6451 |
| 360 | 319.2495 | 331.9753 | 339.0096 | 299.7996 | 327.5452 |
| 380 | 385.7778 | 344.6910 | 364.0340 | 320.2464 | 342.4988 |
| 400 | 377.5380 | 403.3864 | 360.6771 | 299.5962 | 300.6897 |
| 420 | 286.7991 | 358.5256 | 319.6818 | 293.5944 | 314.2192 |
| 440 | 381.7088 | 329.0253 | 317.8507 | 300.6134 | 325.1038 |
| 460 | 363.2965 | 330.0425 | 370.5444 | 346.4915 | 354.1972 |
| 480 | 370.2138 | 378.7689 | 338.2975 | 338.7604 | 332.7332 |
| 500 | 325.6582 | 329.0253 | 305.9489 | 335.9121 | 321.2382 |
| 520 | 377.1311 | 341.2323 | 350.4028 | 294.8151 | 332.8349 |
| 540 | 361.9741 | 329.6356 | 336.5682 | 324.7223 | 325.9176 |
| 560 | 319.4529 | 339.1978 | 299.7437 | 305.8014 | 358.8765 |
| 580 | 373.4690 | 322.8200 | 344.5028 | 315.2618 | 356.1300 |
| 600 | 321.2840 | 323.2269 | 310.6283 | 322.5861 | 350.3316 |
| 620 | 374.3846 | 360.0515 | 307.6782 | 298.8841 | 360.1990 |
| 640 | 356.5826 | 313.8682 | 336.4665 | 356.9692 | 366.2008 |
| 660 | 350.2757 | 355.6773 | 315.6128 | 300.3082 | 337.9211 |
| 680 | 312.6373 | 371.1395 | 330.2612 | 292.7806 | 312.2864 |
| 700 | 311.2132 | 335.4340 | 316.2231 | 299.4944 | 314.7278 |
| 720 | 363.0931 | 287.2162 | 305.3385 | 304.2755 | 342.7022 |
| 740 | 320.2667 | 376.8361 | 320.8008 | 308.1411 | 344.6350 |
| 760 | 331.9651 | 347.3358 | 301.4730 | 290.0340 | 353.0782 |
| 780 | 332.4738 | 320.6838 | 350.9115 | 374.4659 | 337.4125 |
| 800 | 370.0104 | 355.4738 | 302.2868 | 311.9049 | 357.5541 |
| 820 | 348.7498 | 354.4566 | 319.7835 | 309.7687 | 320.5261 |

TABLE 10-continued

Torque data at 60° C. of w/o latices of Example 3 comprising 3 wt % of a carbonyl functional inversion agent.

| | Torque (g · cm) | | | | |
|---|---|---|---|---|---|
| Time (sec) | Control | Glycerol | CMPG 1 | CMPG 2 | CMG |
| 840 | 326.3702 | 324.5494 | 315.5111 | 299.3927 | 321.2382 |
| 860 | 342.9515 | 330.9580 | 295.5729 | 292.1702 | 319.8140 |
| 880 | 368.9931 | 337.8754 | 304.4230 | 294.2047 | 349.1109 |
| 900 | 354.7516 | 343.6737 | 325.1750 | 326.3499 | 318.2882 |
| 920 | 307.4493 | 305.6285 | 303.4058 | 293.1875 | 314.1174 |
| 940 | 309.5856 | 309.7992 | 309.8145 | 286.4736 | 352.4679 |
| 960 | 309.4838 | 333.3995 | 323.5474 | 292.6788 | 341.3798 |
| 980 | 366.4500 | 345.8099 | 297.0988 | 290.8478 | 317.1692 |
| 1000 | 347.3256 | 358.9325 | 305.5420 | 288.7115 | 316.9657 |
| 1020 | 306.6355 | 351.2014 | 329.6509 | 289.2202 | 311.1674 |
| 1040 | 366.3483 | 307.8664 | 297.7091 | 331.3344 | 306.3863 |
| 1060 | 294.9371 | 357.8135 | 346.2321 | 294.2047 | 324.9003 |
| 1080 | 302.1596 | 331.6701 | 295.5729 | 311.7015 | 303.1311 |
| 1100 | 324.0306 | 342.8599 | 293.0298 | 314.1429 | 305.0639 |
| 1120 | 299.3113 | 350.2858 | 289.5711 | 282.6080 | 308.2174 |
| 1140 | 331.9651 | 343.2668 | 285.9090 | 236.1196 | 326.7314 |
| 1160 | 338.6790 | 350.8962 | 296.9971 | 297.7651 | 302.8259 |
| 1180 | 358.3120 | 360.4584 | 318.3594 | 287.1857 | 305.1656 |
| 1200 | 329.7272 | 320.0734 | 287.6383 | 280.2684 | 287.9740 |

The data of Table 10 and FIG. 1 demonstrate that the w/o latices of Example 3 comprising 3 wt % of a carbonyl functional inversion agent invert faster than w/o latices comprising no inversion agent (control w/o latices) at 60° C. in 3.5% SSW and faster than w/o latices comprising 3 wt % glycerol at 60° C. in 3.5% SSW. The data of Table 10 and FIG. 1 also demonstrate that the w/o latices of Example 3 comprising 3 wt % of a carbonyl functional inversion agent invert to a greater extent than w/o latices comprising no inversion agent (control w/o latices) at 60° C. in 3.5% SSW and to a greater extent than w/o latices comprising 3 wt % glycerol at 60° C. in 3.5% SSW. The faster inversion rates and greater extent of inversion of the w/o latices comprising a carbonyl functional inversion agent provide better performance of the invertible latices than control w/o latices and w/o latices comprising glycerol under high stress conditions such as high TDS and elevated temperature.

Example 7B

Figure 2:
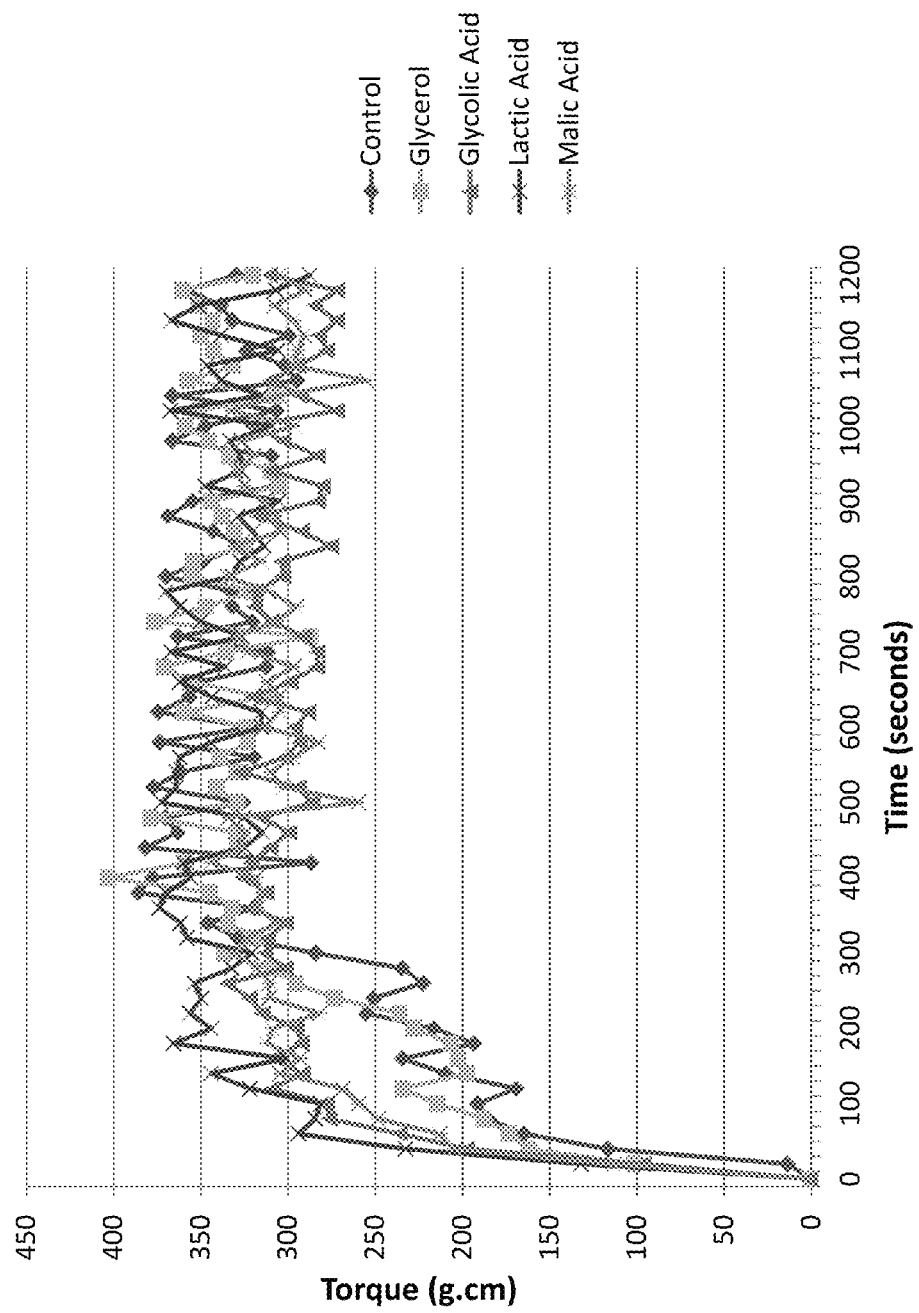
FIG. 2 is a line graph of torque monitor data at 60° C. showing the invertibility of w/o latices comprising 3 wt % of a carbonyl functional inversion agent and 3.3% of TDA-12 as an inverting surfactant ([polymer]=10000 ppm in 3.5% SSW).

Torque data at 60° C. for w/o latices comprising 3 wt % of a carbonyl functional inversion agent are presented in Table 11 and FIG. 2.

TABLE 11

Torque data at 60° C. of w/o latices of Example 3 comprising 3 wt % of a carbonyl functional inversion agent.

| | Torque (g · cm) | | | | |
|---|---|---|---|---|---|
| Time (sec) | Control | Glycerol | Glycolic Acid | Lactic Acid | Malic Acid |
| 0 | −0.3713 | 0.5544 | 1.0071 | −0.9104 | −0.1526 |
| 20 | 13.7685 | 101.3641 | 96.4254 | 132.1462 | 113.3728 |
| 40 | 116.7145 | 162.0941 | 197.4386 | 232.7525 | 204.6204 |
| 60 | 164.8305 | 173.2839 | 235.8907 | 294.0928 | 213.0636 |
| 80 | 185.1756 | 187.7289 | 276.2756 | 284.4289 | 248.4639 |
| 100 | 191.3808 | 214.5844 | 277.6998 | 281.3772 | 259.1451 |
| 120 | 169.1030 | 234.2173 | 308.8277 | 321.9655 | 268.6056 |
| 140 | 209.6914 | 197.4945 | 291.7379 | 344.1416 | 304.7180 |
| 160 | 234.4106 | 202.4790 | 308.5225 | 300.6032 | 293.5282 |
| 180 | 193.4153 | 206.8532 | 292.2465 | 365.7074 | 311.8388 |
| 200 | 216.6087 | 227.8086 | 294.8914 | 344.0399 | 308.6853 |
| 220 | 255.1626 | 236.2518 | 314.7278 | 356.2469 | 282.0333 |

TABLE 11-continued

Torque data at 60° C. of w/o latices of Example 3 comprising 3 wt % of a carbonyl functional inversion agent.

| | Torque (g · cm) | | | |
|---|---|---|---|---|
| Time (sec) | Control | Glycerol | Glycolic Acid | Lactic Acid | Malic Acid |
| 240 | 250.9918 | 273.1781 | 322.0520 | 349.6348 | 311.0250 |
| 260 | 222.6105 | 295.9646 | 334.6659 | 353.8055 | 310.4146 |
| 280 | 234.8175 | 309.6975 | 301.3000 | 332.3415 | 317.9423 |
| 300 | 284.1543 | 336.4512 | 313.1002 | 320.7448 | 329.6407 |
| 320 | 329.1168 | 318.1407 | 311.7778 | 357.8746 | 323.9441 |
| 340 | 346.0032 | 334.3150 | 301.4018 | 361.7401 | 306.5491 |
| 360 | 319.2495 | 331.9753 | 320.8313 | 374.0489 | 317.0268 |
| 380 | 385.7778 | 344.6910 | 312.4898 | 369.9799 | 315.1957 |
| 400 | 377.5380 | 403.3864 | 325.8158 | 355.9418 | 318.2475 |
| 420 | 286.7991 | 358.5256 | 321.0347 | 359.8073 | 343.8822 |
| 440 | 381.7088 | 329.0253 | 310.1501 | 324.8138 | 327.0976 |
| 460 | 363.2965 | 330.0425 | 299.4690 | 314.8448 | 324.3510 |
| 480 | 370.2138 | 378.7689 | 315.0330 | 325.4242 | 334.3201 |
| 500 | 325.6582 | 329.0253 | 286.0413 | 372.6247 | 259.5520 |
| 520 | 377.1311 | 341.2323 | 293.9758 | 364.1815 | 302.7852 |
| 540 | 361.9741 | 329.6356 | 327.4434 | 363.9781 | 309.9060 |
| 560 | 319.4529 | 339.1978 | 301.4018 | 362.1470 | 297.0886 |
| 580 | 373.4690 | 322.8200 | 293.3655 | 344.2434 | 282.6436 |
| 600 | 321.2840 | 323.2269 | 296.1121 | 315.1499 | 313.2629 |
| 620 | 374.3846 | 360.0515 | 288.5844 | 315.3534 | 304.9215 |
| 640 | 356.5826 | 313.8682 | 319.9158 | 343.5313 | 305.3284 |
| 660 | 350.2757 | 355.6773 | 298.8586 | 362.2487 | 312.4491 |
| 680 | 312.6373 | 371.1395 | 283.3964 | 336.3088 | 296.6817 |
| 700 | 311.2132 | 335.4340 | 283.3964 | 367.0298 | 322.8251 |
| 720 | 363.0931 | 287.2162 | 290.7206 | 326.5432 | 329.3355 |
| 740 | 320.2667 | 376.8361 | 309.3363 | 350.1434 | 306.8542 |
| 760 | 331.9651 | 347.3358 | 319.1020 | 361.9436 | 295.0541 |
| 780 | 332.4738 | 320.6838 | 318.3899 | 369.9799 | 311.3302 |
| 800 | 370.0104 | 355.4738 | 302.8259 | 332.0363 | 335.0321 |
| 820 | 348.7498 | 354.4566 | 303.4363 | 327.6622 | 315.0940 |
| 840 | 326.3702 | 324.5494 | 275.5636 | 313.8275 | 331.2683 |
| 860 | 342.9515 | 330.9580 | 291.9413 | 320.3379 | 304.4128 |
| 880 | 368.9931 | 337.8754 | 317.2709 | 328.7811 | 307.0577 |
| 900 | 354.7516 | 343.6737 | 282.7861 | 305.2826 | 313.9750 |
| 920 | 307.4493 | 305.6285 | 280.2429 | 347.4986 | 325.3682 |
| 940 | 309.5856 | 309.7992 | 310.0484 | 326.7466 | 329.3355 |
| 960 | 309.4838 | 333.3995 | 282.8878 | 327.2552 | 319.6716 |
| 980 | 366.4500 | 345.8099 | 302.6225 | 333.5622 | 326.5889 |
| 1000 | 347.3256 | 358.9325 | 320.7296 | 309.6568 | 295.9696 |
| 1020 | 306.6355 | 351.2014 | 272.0032 | 367.6402 | 332.9976 |
| 1040 | 366.3483 | 307.8664 | 292.6534 | 315.7603 | 305.0232 |
| 1060 | 294.9371 | 357.8135 | 309.7432 | 338.5468 | 254.8726 |
| 1080 | 302.1596 | 331.6701 | 294.2810 | 346.2779 | 296.7834 |
| 1100 | 324.0306 | 342.8599 | 277.6998 | 305.7912 | 294.3420 |
| 1120 | 299.3113 | 350.2858 | 282.2774 | 338.5468 | 290.8834 |
| 1140 | 331.9651 | 343.2668 | 271.9014 | 367.0298 | 296.8852 |
| 1160 | 338.6790 | 350.8962 | 284.9223 | 351.6693 | 307.9732 |
| 1180 | 358.3120 | 360.4584 | 271.6980 | 306.9102 | 290.3748 |
| 1200 | 329.7272 | 320.0734 | 310.5570 | 287.7858 | 305.4301 |

The data of Table 11 and FIG. 2 demonstrate that the w/o latices of Example 3 comprising 3 wt % of a carbonyl functional inversion agent invert faster than w/o latices comprising no inversion agent (control w/o latices) at 60° C. in 3.5% SSW and faster than w/o latices comprising 3 wt % glycerol at 60° C. in 3.5% SSW. The data of Table 11 and FIG. 2 also demonstrate that the w/o latices of Example 3 comprising 3 wt % of a carbonyl functional inversion agent invert to a greater extent than w/o latices comprising no inversion agent (control w/o latices) at 60° C. in 3.5% SSW and to a greater extent than w/o latices comprising 3 wt % glycerol at 60° C. in 3.5% SSW. The faster inversion rates and greater extent of inversion of the w/o latices comprising a carbonyl functional inversion agent provide better performance of the invertible latices than control w/o latices and w/o latices comprising glycerol under high stress conditions such as high TDS and elevated temperature.

Example 7C

Figure 3:
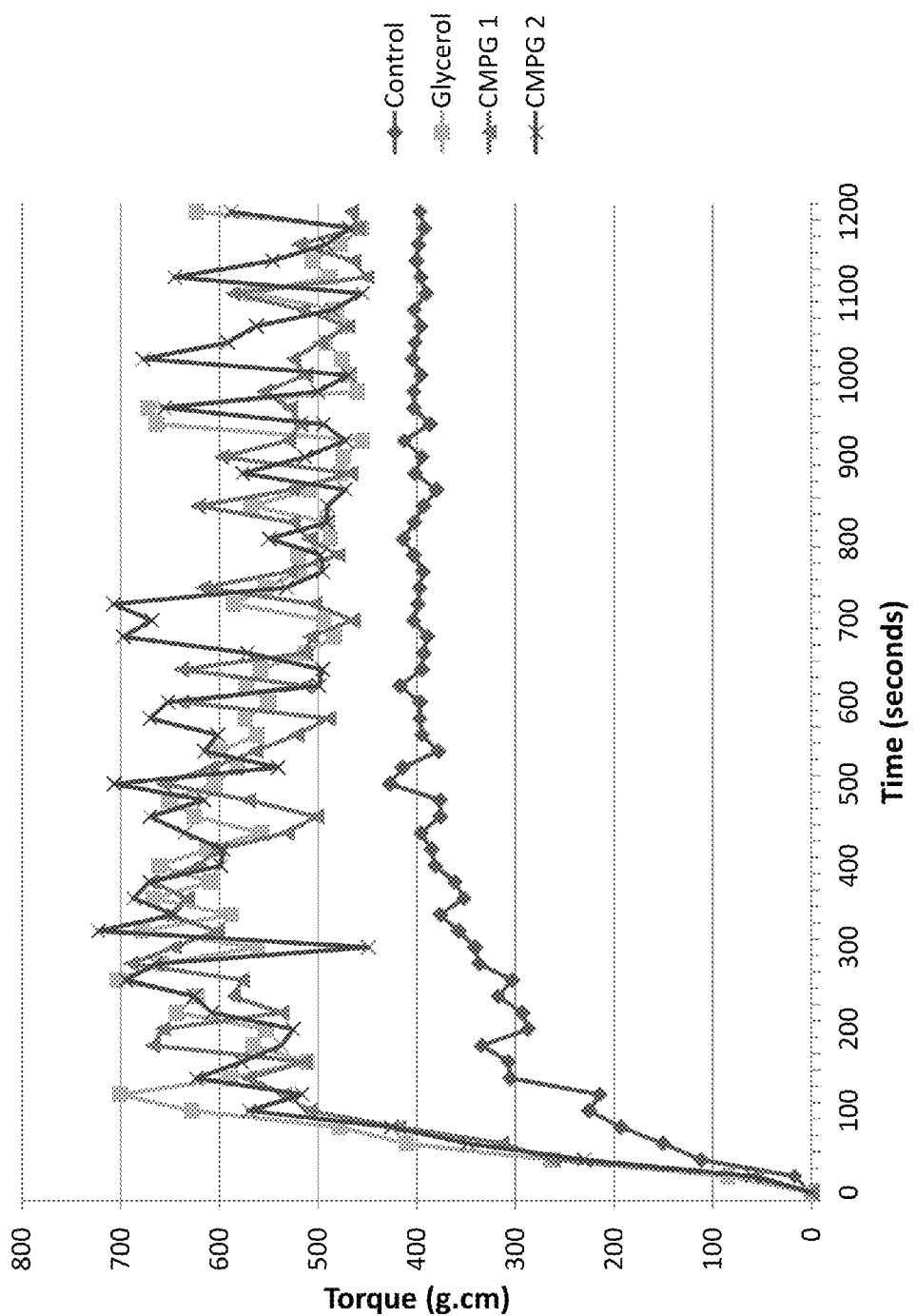
FIG. 3 is a line graph of torque monitor data at 60° C. showing the invertibility of w/o latices comprising 3 wt % of an carbonyl functional inversion agent and 3.3% of TDA-12 as an inverting surfactant ([polymer]=10000 ppm in 3.5% SSW).

Torque data at 60° C. for w/o latices comprising 3 wt % of an carbonyl functional inversion agent are presented in Table 12 and FIG. 3.

TABLE 12

Torque data at 60° C. of w/o latices of Example 3 comprising 3 wt % of an carbonyl functional inversion agent.

| | Torque (g · cm) | | | |
|---|---|---|---|---|
| Time (sec) | Control | Glycerol | NHSI | Glycine |
| 0 | −0.3713 | 0.5544 | 0.0509 | −0.2136 |
| 20 | 13.7685 | 101.3641 | 82.3466 | 32.8471 |
| 40 | 116.7145 | 162.0941 | 147.1456 | 119.2118 |
| 60 | 164.8305 | 173.2839 | 170.1355 | 152.4760 |
| 80 | 185.1756 | 187.7289 | 180.3080 | 184.1125 |
| 100 | 191.3808 | 214.5844 | 217.9464 | 147.7966 |
| 120 | 169.1030 | 234.2173 | 196.5841 | 151.1536 |
| 140 | 209.6914 | 197.4945 | 188.7512 | 177.3987 |
| 160 | 234.4106 | 202.4790 | 213.6739 | 182.6884 |
| 180 | 193.4153 | 206.8532 | 225.4740 | 169.4641 |
| 200 | 216.6087 | 227.8086 | 263.7227 | 223.6837 |
| 220 | 255.1626 | 236.2518 | 250.1933 | 246.9788 |
| 240 | 250.9918 | 273.1781 | 287.0178 | 211.3749 |
| 260 | 222.6105 | 295.9646 | 286.5092 | 242.0959 |
| 280 | 234.8175 | 309.6975 | 320.8923 | 268.2393 |
| 300 | 284.1543 | 336.4512 | 321.9096 | 266.4083 |
| 320 | 329.1168 | 318.1407 | 337.2701 | 313.9140 |
| 340 | 346.0032 | 334.3150 | 324.2493 | 287.9740 |
| 360 | 319.2495 | 331.9753 | 352.1220 | 297.2310 |
| 380 | 385.7778 | 344.6910 | 365.7532 | 290.0085 |
| 400 | 377.5380 | 403.3864 | 344.8995 | 343.8212 |
| 420 | 286.7991 | 358.5256 | 371.8567 | 312.7950 |
| 440 | 381.7088 | 329.0253 | 343.4753 | 346.6695 |
| 460 | 363.2965 | 330.0425 | 321.2992 | 302.8259 |
| 480 | 370.2138 | 378.7689 | 357.5134 | 328.6641 |
| 500 | 325.6582 | 329.0253 | 325.7751 | 348.9075 |
| 520 | 377.1311 | 341.2323 | 357.9203 | 315.5416 |
| 540 | 361.9741 | 329.6356 | 323.9441 | 304.3518 |
| 560 | 319.4529 | 339.1978 | 317.6371 | 308.9294 |
| 580 | 373.4690 | 322.8200 | 318.1458 | 321.4417 |
| 600 | 321.2840 | 323.2269 | 314.7888 | 293.6707 |
| 620 | 374.3846 | 360.0515 | 326.5889 | 340.9729 |
| 640 | 356.5826 | 313.8682 | 333.0994 | 286.4482 |
| 660 | 350.2757 | 355.6773 | 328.1148 | 292.2465 |
| 680 | 312.6373 | 371.1395 | 317.7389 | 341.0746 |
| 700 | 311.2132 | 335.4340 | 315.6026 | 334.0556 |
| 720 | 363.0931 | 287.2162 | 361.8876 | 307.0984 |
| 740 | 320.2667 | 376.8361 | 345.7133 | 296.8241 |
| 760 | 331.9651 | 347.3358 | 320.5872 | 295.8069 |
| 780 | 332.4738 | 320.6838 | 360.4635 | 334.2590 |
| 800 | 370.0104 | 355.4738 | 283.2540 | 307.3018 |
| 820 | 348.7498 | 354.4566 | 336.1511 | 290.3137 |
| 840 | 326.3702 | 324.5494 | 340.4236 | 308.9294 |
| 860 | 342.9515 | 330.9580 | 312.6526 | 334.4625 |
| 880 | 368.9931 | 337.8754 | 348.5616 | 309.9467 |
| 900 | 354.7516 | 343.6737 | 367.6860 | 330.8004 |
| 920 | 307.4493 | 305.6285 | 340.4236 | 292.4500 |
| 940 | 309.5856 | 309.7992 | 350.1892 | 320.1192 |
| 960 | 309.4838 | 333.3995 | 335.0321 | 316.0502 |
| 980 | 366.4500 | 345.8099 | 354.1565 | 314.1174 |
| 1000 | 347.3256 | 358.9325 | 340.8305 | 280.6498 |
| 1020 | 306.6355 | 351.2014 | 356.6996 | 294.5862 |
| 1040 | 366.3483 | 307.8664 | 346.1202 | 314.3209 |
| 1060 | 294.9371 | 357.8135 | 366.1601 | 331.8176 |
| 1080 | 302.1596 | 331.6701 | 355.3772 | 330.0883 |
| 1100 | 324.0306 | 342.8599 | 346.2219 | 279.6326 |
| 1120 | 299.3113 | 350.2858 | 363.7187 | 294.4845 |
| 1140 | 331.9651 | 343.2668 | 338.2874 | 321.4417 |
| 1160 | 338.6790 | 350.8962 | 373.3826 | 295.8069 |
| 1180 | 358.3120 | 360.4584 | 319.8751 | 300.6897 |
| 1200 | 329.7272 | 320.0734 | 287.7299 | 287.6689 |

The data of Table 12 and FIG. 3 demonstrate that some of the w/o latices of Example 3 comprising 3 wt % of an carbonyl functional inversion agent, such as NHSI, invert faster than w/o latices comprising no inversion agent (control w/o latices) at 60° C. in 3.5% SSW and as fast as w/o latices comprising 3 wt % glycerol at 60° C. in 3.5% SSW. The data of Table 12 and FIG. 3 also demonstrate that some of the w/o latices of Example 3 comprising 3 wt % of an carbonyl functional inversion agent, such as NHSI, invert to a greater extent than w/o latices comprising no inversion agent (control w/o latices) at 60° C. in 3.5% SSW and as completely as w/o latices comprising 3 wt % glycerol at 60° C. in 3.5% SSW. The comparable inversion rates and comparable extent of inversion of the w/o latices comprising an carbonyl functional inversion agent provide comparable performance of the invertible latices to w/o latices comprising glycerol under high stress conditions such as high TDS and elevated temperature.

Example 7D

Figure 4:
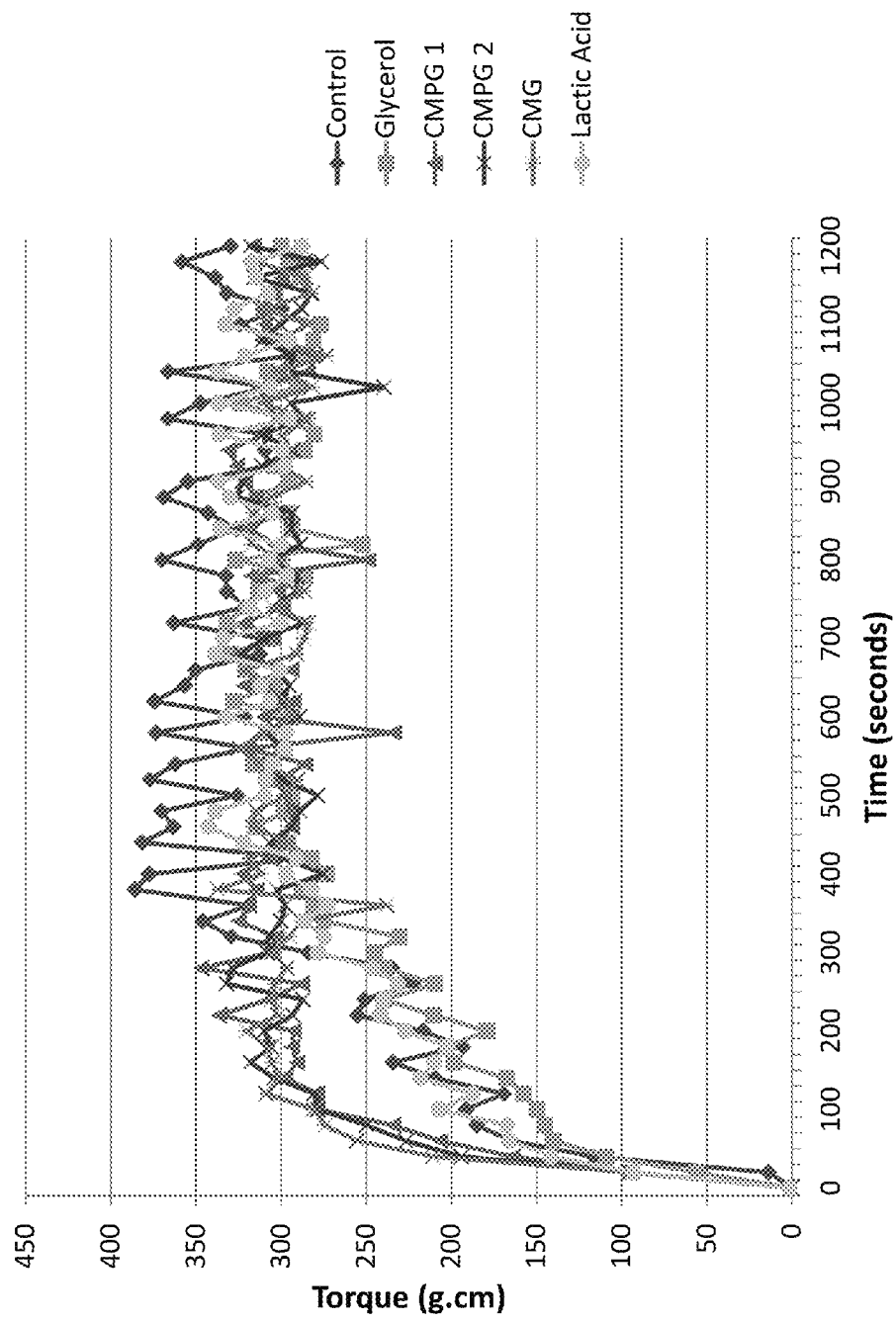
FIG. 4 is a line graph of torque monitor data at 60° C. showing the invertibility of w/o latices comprising 2 wt % of a carbonyl functional inversion agent and 3.3% of TDA-12 as an inverting surfactant ([polymer]=10000 ppm in 3.5% SSW).

Torque data at 60° C. for w/o latices comprising 2 wt % of a carbonyl functional inversion agent are presented in Table 13 and FIG. 4.

TABLE 13

Torque data at 60° C. of w/o latices of Example 3 comprising 2 wt % of a carbonyl functional inversion agent.

| | Torque (g · cm) | | | | | |
|---|---|---|---|---|---|---|
| Time (sec) | Control | Glycerol | CMPG 1 | CMPG 2 | CMG | Lactic Acid |
| 0 | −0.3713 | −0.3204 | −0.7477 | −0.1424 | 0.4832 | 1.1292 |
| 20 | 13.7685 | 55.9336 | 95.7896 | 95.3776 | 93.6635 | 93.2922 |
| 40 | 116.7145 | 109.1359 | 163.9455 | 194.2546 | 210.8510 | 141.3066 |
| 60 | 164.8305 | 140.1622 | 206.5684 | 226.7049 | 255.5084 | 166.1275 |
| 80 | 185.1756 | 145.2484 | 234.3394 | 250.0000 | 274.3276 | 167.5517 |
| 100 | 191.3808 | 149.8260 | 278.7933 | 278.4831 | 281.0415 | 207.3263 |
| 120 | 169.1030 | 157.5572 | 278.8951 | 280.7210 | 308.8125 | 187.1847 |
| 140 | 209.6914 | 167.6280 | 297.6125 | 304.0161 | 300.8779 | 218.1091 |
| 160 | 234.4106 | 198.5524 | 290.5935 | 318.0542 | 305.4555 | 210.1746 |
| 180 | 193.4153 | 203.1301 | 293.4418 | 305.8472 | 307.9987 | 202.4434 |
| 200 | 216.6087 | 179.1229 | 292.8314 | 309.9162 | 320.4091 | 226.9592 |
| 220 | 255.1626 | 210.5560 | 336.4716 | 293.2332 | 301.9969 | 241.9128 |
| 240 | 250.9918 | 239.5477 | 307.3781 | 287.2314 | 305.3538 | 240.0818 |
| 260 | 222.6105 | 209.6405 | 287.9486 | 332.0923 | 303.9296 | 231.5369 |
| 280 | 234.8175 | 239.5477 | 346.8475 | 328.5319 | 296.8089 | 246.3888 |
| 300 | 284.1543 | 245.0409 | 305.4454 | 308.0851 | 305.2521 | 278.5339 |
| 320 | 329.1168 | 230.4942 | 302.9022 | 307.3730 | 295.2830 | 274.8718 |
| 340 | 346.0032 | 274.9481 | 324.8749 | 300.1506 | 288.2640 | 286.8754 |
| 360 | 319.2495 | 281.1534 | 318.8731 | 297.5057 | 237.9100 | 272.8373 |
| 380 | 385.7778 | 287.7655 | 314.2955 | 302.4902 | 337.6007 | 282.0943 |
| 400 | 377.5380 | 273.2188 | 322.8404 | 275.5330 | 311.7625 | 297.2514 |
| 420 | 286.7991 | 282.3741 | 306.2592 | 298.2178 | 318.6798 | 291.0461 |
| 440 | 381.7088 | 296.1070 | 301.9867 | 306.7627 | 295.8934 | 322.0723 |
| 460 | 363.2965 | 314.1123 | 293.8487 | 293.9453 | 316.7470 | 342.7226 |
| 480 | 370.2138 | 298.3449 | 293.6452 | 289.0625 | 314.7125 | 338.7553 |
| 500 | 325.6582 | 293.4621 | 298.2229 | 278.5848 | 297.5210 | 309.6619 |
| 520 | 377.1311 | 308.1106 | 301.0712 | 299.4385 | 290.4002 | 309.1532 |
| 540 | 361.9741 | 316.3503 | 285.6089 | 306.8644 | 311.8642 | 305.6946 |
| 560 | 319.4529 | 299.6674 | 319.2800 | 297.6074 | 324.6816 | 297.6583 |
| 580 | 373.4690 | 307.3985 | 233.9325 | 310.0179 | 310.4401 | 297.1497 |
| 600 | 321.2840 | 294.1742 | 310.4299 | 289.2660 | 293.3502 | 332.1431 |
| 620 | 374.3846 | 328.0487 | 292.8314 | 300.1506 | 296.0968 | 306.5084 |
| 640 | 356.5826 | 303.4312 | 322.0266 | 295.2677 | 309.3211 | 312.1033 |
| 660 | 350.2757 | 320.3176 | 294.0521 | 302.6937 | 321.7316 | 300.7100 |
| 680 | 312.6373 | 329.6763 | 324.6714 | 323.5474 | 291.0105 | 338.7553 |
| 700 | 311.2132 | 307.0933 | 304.5298 | 310.5265 | 286.5346 | 334.1777 |
| 720 | 363.0931 | 331.9143 | 321.4162 | 286.6211 | 283.7880 | 300.2014 |
| 740 | 320.2667 | 320.4193 | 298.9349 | 304.7282 | 304.4383 | 318.7154 |
| 760 | 331.9651 | 313.5020 | 301.8850 | 290.7918 | 286.5346 | 309.3567 |
| 780 | 332.4738 | 285.9344 | 317.3472 | 290.7918 | 312.8815 | 296.4376 |
| 800 | 370.0104 | 326.7263 | 248.7844 | 304.7282 | 298.7417 | 307.2205 |
| 820 | 348.7498 | 252.4668 | 303.9195 | 288.5539 | 317.2557 | 299.8962 |
| 840 | 326.3702 | 293.5638 | 318.4662 | 294.1488 | 320.0022 | 335.9070 |
| 860 | 342.9515 | 296.0052 | 302.2919 | 293.2332 | 316.6453 | 305.1860 |
| 880 | 368.9931 | 314.2141 | 315.0075 | 325.7853 | 305.8624 | 330.1086 |
| 900 | 354.7516 | 295.2932 | 321.2128 | 322.9370 | 285.5174 | 337.0260 |
| 920 | 307.4493 | 301.7019 | 325.8921 | 311.2386 | 299.0468 | 297.7600 |
| 940 | 309.5856 | 286.5448 | 330.7749 | 292.9281 | 294.8761 | 299.4893 |
| 960 | 309.4838 | 280.6447 | 310.4299 | 310.8317 | 299.0468 | 336.5173 |
| 980 | 366.4500 | 297.1242 | 301.2746 | 286.4176 | 283.9915 | 295.2169 |
| 1000 | 347.3256 | 324.1831 | 309.2092 | 294.3522 | 311.3556 | 336.8225 |
| 1020 | 306.6355 | 290.4104 | 312.4644 | 239.6240 | 281.7535 | 306.3049 |
| 1040 | 366.3483 | 308.1106 | 284.1848 | 293.7419 | 301.4882 | 337.1277 |
| 1060 | 294.9371 | 285.7310 | 280.0140 | 293.9453 | 273.5138 | 321.1568 |
| 1080 | 302.1596 | 281.0516 | 310.9385 | 310.9334 | 301.9969 | 295.3186 |
| 1100 | 324.0306 | 276.7792 | 309.7178 | 300.6592 | 284.0932 | 332.6518 |
| 1120 | 299.3113 | 310.1451 | 310.6333 | 287.9435 | 309.8297 | 327.6672 |
| 1140 | 331.9651 | 303.5329 | 304.9367 | 281.9417 | 282.5673 | 307.6274 |
| 1160 | 338.6790 | 288.4776 | 299.5453 | 315.7145 | 285.5174 | 314.9516 |

TABLE 13-continued

Torque data at 60° C. of w/o latices of Example 3 comprising 2 wt % of a carbonyl functional inversion agent.

| Time (sec) | Torque (g · cm) | | | | | |
|---|---|---|---|---|---|---|
| | Control | Glycerol | CMPG 1 | CMPG 2 | CMG | Lactic Acid |
| 1180 | 358.3120 | 294.9880 | 286.1176 | 276.3468 | 315.5263 | 317.5964 |
| 1200 | 329.7272 | 299.9725 | 315.9231 | 317.8507 | 288.3657 | 287.7909 |

The data of Table 13 and FIG. 4 demonstrate that the w/o latices of Example 3 comprising 2 wt % of a carbonyl functional inversion agent invert faster than w/o latices comprising no inversion agent (control w/o latices) at 60° C. in 3.5% SSW and faster than w/o latices comprising 2 wt % glycerol at 60° C. in 3.5% SSW. The data of Table 13 and FIG. 4 also demonstrate that the w/o latices of Example 3 comprising 2 wt % of a carbonyl functional inversion agent invert to a greater extent than w/o latices comprising no inversion agent (control w/o latices) at 60° C. in 3.5% SSW and to a greater extent than w/o latices comprising 2 wt % glycerol at 60° C. in 3.5% SSW. The faster inversion rates and greater extent of inversion of the w/o latices comprising a carbonyl functional inversion agent provide better performance of the invertible latices than control w/o latices and w/o latices comprising glycerol under high stress conditions such as high TDS and elevated temperature.

Example 8

The invertibility of the w/o latices of Example 3 was determined by torque monitor technique as described in Example 7 with the following modifications. Experiments were conducted at room temperature (ca 25° C.) or 4° C. to evaluate the performance of w/o latices across a range of temperatures.

Example 8A

Torque data at room temperate for w/o latices comprising 3 wt % of a carbonyl functional inversion agent are presented in Table 14 and FIG. 5.

TABLE 14

Torque data at room temperature of w/o latices of Example 3 comprising 3 wt % of a carbonyl functional inversion agent.

| Time (sec) | Torque (g · cm) | | | |
|---|---|---|---|---|
| | Control | Glycerol | CMPG 1 | CMPG 2 |
| 0 | −0.0712 | −0.0865 | −0.6358 | −0.3713 |
| 20 | 2.0650 | 26.2604 | 104.3447 | 83.2469 |
| 40 | 141.0217 | 284.3374 | 325.6989 | 330.5410 |
| 60 | 295.6441 | 424.2096 | 318.3746 | 484.8582 |
| 80 | 382.3140 | 531.7332 | 477.3712 | 582.5144 |
| 100 | 475.9013 | 557.2662 | 447.0571 | 500.4222 |
| 120 | 447.4182 | 545.4661 | 455.3986 | 602.9612 |
| 140 | 488.6169 | 518.0003 | 569.5343 | 594.0094 |
| 160 | 518.6259 | 586.9700 | 489.9851 | 616.2872 |
| 180 | 498.6877 | 588.0890 | 568.0084 | 585.8714 |
| 200 | 511.0982 | 564.9974 | 512.4664 | 524.3276 |
| 220 | 472.0357 | 573.1354 | 480.0161 | 572.4436 |
| 240 | 460.8459 | 540.7867 | 565.9739 | 548.0296 |
| 260 | 472.7478 | 522.7814 | 490.0869 | 463.4959 |
| 280 | 427.8870 | 527.3590 | 569.0257 | 545.6899 |
| 300 | 450.1648 | 448.7254 | 437.2915 | 559.0159 |
| 320 | 449.4527 | 520.3400 | 383.7840 | 548.6399 |
| 340 | 447.7234 | 464.7980 | 567.8050 | 513.5447 |
| 360 | 438.5681 | 525.8331 | 513.8906 | 525.6500 |
| 380 | 450.5717 | 453.9134 | 507.7871 | 525.2431 |
| 400 | 439.2802 | 512.1002 | 553.4617 | 565.7298 |
| 420 | 431.0404 | 519.2210 | 476.6591 | 518.8344 |
| 440 | 448.0286 | 454.4220 | 501.3784 | 490.5548 |
| 460 | 422.9024 | 467.9515 | 553.4617 | 519.4448 |
| 480 | 431.0404 | 523.3917 | 480.5247 | 481.8064 |
| 500 | 429.2094 | 438.7563 | 457.6365 | 519.0379 |
| 520 | 457.8959 | 450.8616 | 433.6294 | 479.3650 |
| 540 | 426.4628 | 438.4511 | 456.1106 | 481.5013 |
| 560 | 397.8780 | 433.2631 | 391.6168 | 511.5102 |
| 580 | 406.8298 | 449.3357 | 430.2724 | 521.5810 |
| 600 | 438.3647 | 487.1775 | 419.6930 | 441.4215 |
| 620 | 399.5056 | 423.4975 | 423.0499 | 468.2770 |
| 640 | 397.5728 | 459.7117 | 448.3795 | 449.4578 |
| 660 | 392.2831 | 424.8199 | 418.3706 | 461.5631 |
| 680 | 407.2367 | 493.9931 | 540.2374 | 446.2026 |
| 700 | 413.1368 | 428.3803 | 488.4593 | 462.8855 |
| 720 | 421.6817 | 425.3286 | 448.5830 | 467.9718 |
| 740 | 381.5002 | 457.5755 | 413.5895 | 484.3496 |
| 760 | 380.0761 | 413.1215 | 458.7555 | 445.1853 |
| 780 | 399.6073 | 446.4874 | 409.2153 | 425.5524 |
| 800 | 375.0916 | 468.5618 | 452.3468 | 473.2615 |
| 820 | 412.6282 | 410.3750 | 408.7067 | 467.7684 |
| 840 | 438.6698 | 413.5284 | 491.4093 | 431.7576 |
| 860 | 370.6156 | 446.9961 | 515.8234 | 489.7410 |
| 880 | 398.7935 | 451.3702 | 404.7394 | 438.5732 |
| 900 | 374.2778 | 440.7908 | 475.7350 | 436.1318 |
| 920 | 406.1178 | 409.7646 | 408.6049 | 443.5577 |
| 940 | 397.3694 | 415.3595 | 480.4230 | 485.4685 |
| 960 | 373.3622 | 449.9461 | 419.6930 | 466.8528 |
| 980 | 366.4449 | 457.2703 | 398.4324 | 451.8992 |
| 1000 | 426.4628 | 405.4921 | 431.9000 | 478.4495 |
| 1020 | 407.4402 | 401.8300 | 375.4425 | 444.5750 |
| 1040 | 379.3640 | 410.1715 | 451.1261 | 446.3043 |
| 1060 | 432.7698 | 458.0841 | 444.6157 | 443.3543 |
| 1080 | 396.9625 | 435.0942 | 392.6341 | 462.2752 |
| 1100 | 374.8881 | 402.2369 | 536.4736 | 410.9039 |
| 1120 | 408.5592 | 409.7646 | 395.7876 | 460.3424 |
| 1140 | 397.1659 | 446.8943 | 430.1707 | 416.2954 |
| 1160 | 376.5157 | 412.6129 | 511.4492 | 423.5179 |
| 1180 | 391.9779 | 401.6266 | 451.6347 | 451.6958 |
| 1200 | 363.6983 | 436.4166 | 387.4461 | 420.5678 |

The data of Table 14 and FIG. 5 demonstrate that the w/o latices of Example 3 comprising 3 wt % of a carbonyl functional inversion agent invert faster than w/o latices comprising no inversion agent (control w/o latices) at room temperature in 3.5% SSW and as fast as w/o latices comprising 3 wt % glycerol at room temperature in 3.5% SSW. The data of Table 14 and FIG. 5 also demonstrate that the w/o latices of Example 3 comprising 3 wt % of a carbonyl functional inversion agent invert to a greater extent than w/o latices comprising no inversion agent (control w/o latices) at room temperature in 3.5% SSW and as completely as w/o latices comprising 3 wt % glycerol at room temperature in 3.5% SSW. The faster or comparable inversion rates and greater or comparable extent of inversion of the w/o latices comprising a carbonyl functional inversion agent provide better or comparable performance of the invertible latices than control w/o latices and w/o latices comprising glycerol under high stress conditions such as high TDS.

Example 8B

Torque data at 4° C. for w/o latices comprising 3 wt % of a carbonyl functional inversion agent are presented in Table 15 and FIG. 6.

TABLE 15

Torque data at 4° C. of w/o latices of Example 3 comprising 3 wt % of a carbonyl functional inversion agent.

| | Torque (g · cm) | | | |
|---|---|---|---|---|
| Time (sec) | Control | Glycerol | CMPG 1 | CMPG 2 |
| 0 | 0.2441 | 0.0559 | 0.4272 | −0.7579 |
| 20 | 17.2323 | 85.0983 | 56.5796 | 60.2773 |
| 40 | 112.0402 | 263.9313 | 262.2681 | 230.4637 |
| 60 | 150.6958 | 411.0260 | 313.8428 | 348.2615 |
| 80 | 193.5221 | 478.5716 | 418.6198 | 425.6744 |
| 100 | 225.3621 | 628.4129 | 509.1553 | 570.0226 |
| 120 | 215.0879 | 700.9430 | 534.3831 | 516.4134 |
| 140 | 305.3182 | 589.5538 | 570.2922 | 623.3266 |
| 160 | 306.8441 | 512.1409 | 513.8346 | 577.3468 |
| 180 | 334.3099 | 565.7501 | 667.5415 | 537.2670 |
| 200 | 287.2111 | 553.2379 | 657.3690 | 525.0600 |
| 220 | 293.3146 | 643.6717 | 536.9263 | 607.7627 |
| 240 | 317.7287 | 623.4283 | 586.2630 | 625.6663 |
| 260 | 303.3854 | 702.8758 | 577.2095 | 694.5343 |
| 280 | 336.9548 | 657.9132 | 689.4124 | 664.4236 |
| 300 | 341.1255 | 561.6811 | 645.9757 | 449.0712 |
| 320 | 357.5033 | 678.7669 | 602.6408 | 722.6105 |
| 340 | 376.1190 | 588.4349 | 650.6551 | 645.7062 |
| 360 | 352.4170 | 667.2719 | 632.4463 | 686.7015 |
| 380 | 361.4705 | 609.5937 | 668.0501 | 670.7306 |
| 400 | 381.4087 | 661.2701 | 621.4600 | 598.3022 |
| 420 | 384.9691 | 612.6455 | 601.0132 | 596.6746 |
| 440 | 395.7520 | 557.0017 | 531.6366 | 635.0250 |
| 460 | 376.0173 | 625.4628 | 501.9328 | 670.3237 |
| 480 | 376.4242 | 651.3011 | 570.9025 | 615.5955 |
| 500 | 426.9816 | 604.8126 | 656.9621 | 706.6396 |
| 520 | 414.4694 | 582.0262 | 607.9305 | 540.5223 |
| 540 | 378.0518 | 599.4212 | 563.6800 | 615.1886 |
| 560 | 394.7347 | 561.8846 | 521.8709 | 601.4557 |
| 580 | 396.8709 | 574.0916 | 489.5223 | 670.4254 |
| 600 | 396.6675 | 550.7965 | 637.9395 | 652.3183 |
| 620 | 417.0125 | 573.0743 | 513.4277 | 498.9166 |
| 640 | 394.9382 | 558.7311 | 638.1429 | 495.4580 |
| 660 | 393.3105 | 513.1582 | 512.8174 | 571.4467 |
| 680 | 389.3433 | 484.0647 | 507.7311 | 697.2809 |
| 700 | 403.3813 | 494.4407 | 465.0065 | 668.2892 |
| 720 | 398.6003 | 585.6883 | 503.7638 | 707.5551 |
| 740 | 397.0744 | 553.4414 | 616.4754 | 531.9773 |
| 760 | 393.6157 | 519.1600 | 529.0934 | 495.0511 |
| 780 | 403.0762 | 520.2789 | 479.9601 | 497.2890 |
| 800 | 413.5539 | 487.7268 | 509.0535 | 549.5758 |
| 820 | 402.5675 | 490.0665 | 525.5330 | 490.6769 |
| 840 | 393.1071 | 567.5812 | 621.4600 | 490.5752 |
| 860 | 380.1880 | 509.2926 | 527.0589 | 472.6715 |
| 880 | 401.7537 | 476.9440 | 467.5496 | 576.4313 |
| 900 | 395.0399 | 474.5026 | 597.8597 | 513.0564 |
| 920 | 412.6383 | 455.5817 | 530.3141 | 472.3663 |
| 940 | 386.8001 | 663.4064 | 517.9036 | 494.6442 |
| 960 | 403.0762 | 672.7651 | 528.6865 | 655.3701 |
| 980 | 403.1779 | 460.4645 | 554.3213 | 500.1373 |
| 1000 | 395.7520 | 468.3990 | 512.7157 | 468.8059 |
| 1020 | 404.2969 | 475.9267 | 525.2279 | 677.5462 |
| 1040 | 401.6520 | 492.4062 | 497.7620 | 591.6901 |
| 1060 | 396.1589 | 475.1129 | 470.6014 | 562.5966 |
| 1080 | 402.7710 | 481.7251 | 515.2588 | 485.5906 |
| 1100 | 390.7674 | 567.9881 | 586.2630 | 455.0730 |
| 1120 | 395.9554 | 488.5406 | 450.7650 | 644.8924 |

TABLE 15-continued

Torque data at 4° C. of w/o latices of Example 3 comprising 3 wt % of a carbonyl functional inversion agent.

| | Torque (g · cm) | | | |
|---|---|---|---|---|
| Time (sec) | Control | Glycerol | CMPG 1 | CMPG 2 |
| 1140 | 400.5330 | 505.8339 | 464.2944 | 546.0154 |
| 1160 | 398.1934 | 477.8595 | 519.8364 | 491.9993 |
| 1180 | 392.5985 | 456.0903 | 459.1064 | 467.8904 |
| 1200 | 396.8709 | 623.5301 | 466.3289 | 587.9262 |

The data of Table 15 and FIG. 6 demonstrate that the w/o latices of Example 3 comprising 3 wt % of a carbonyl functional inversion agent invert faster than w/o latices comprising no inversion agent (control w/o latices) at 4° C. in 3.5% SSW and as fast as w/o latices comprising 3 wt % glycerol at 4° C. in 3.5% SSW. The data of Table 15 and FIG. 6 also demonstrate that the w/o latices of Example 3 comprising 3 wt % of a carbonyl functional inversion agent invert to a greater extent than w/o latices comprising no inversion agent (control w/o latices) at 4° C. in 3.5% SSW and as completely as w/o latices comprising 3 wt % glycerol at 4° C. in 3.5% SSW. The faster or comparable inversion rates and greater or comparable extent of inversion of the w/o latices comprising a carbonyl functional inversion agent provide better or comparable performance of the invertible latices than control w/o latices and w/o latices comprising glycerol under high stress conditions such as high TDS.

The results of Examples 7 and 8 demonstrate that w/o latices comprising a carbonyl functional inversion agent provide improved performance of the invertible latices over control w/o latices and w/o latices comprising glycerol under high stress conditions such as high TDS and across a broad range of temperatures.

Example 9

The surface tension of carbonyl functional inversion agents at 0.5 wt % was measured in a Kruss-K12 processor tensiometer at room temperature. The tested samples were prepared in deionized water and were neutralized with NaOH or $H_2SO_4$. Data is presented in Table 16 as an average +/− standard deviation (SD) of two experiments.

TABLE 16

Surface tension data of carbonyl functional inversion agents.

| Inversion Agent or Comparative | Surface Tension (mN/m) | SD |
|---|---|---|
| None (deionized water) | 72.13 | 0.14 |
| Lauric Acid | 22.17 | 0.15 |
| CMPG1 | 64.77 | 0.11 |
| CMPG2 | 63.45 | 0.24 |
| CMG | 67.55 | 0.21 |
| Glycolic Acid | 60.06 | 0.09 |
| Lactic Acid | 59.20 | 0.27 |
| Malic Acid | 60.73 | 0.26 |
| Glycine | 60.23 | 0.34 |
| NHSI | 57.62 | 0.24 |

The data of Table 16 demonstrate that carbonyl functional inversion agents do not reduce the surface tension of water or reduce the surface tension of water by 20% or less. By comparison, a known surfactant, lauric acid, reduces the surface tension of water by about 69%.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A water-in-oil latex comprising
   about 15 wt % to 70 wt % of a water soluble or dispersible polymer comprising 1 mol % to about 100 mol % acrylamide monomers;
   about 0.1 wt % to 20.0 wt % of an inversion surfactant characterized as having a hydrophilic/lipophilic balance of 10 or greater; and
   about 0.1 wt % to 20.0 wt % of an inversion agent that is a carbonyl functional inversion agent, wherein the inversion agent is not a surfactant.

2. The latex of claim 1 comprising about 1.0 wt % to 20.0 wt % of the inversion agent and inversion surfactant combined.

3. The latex of claim 1, wherein the inversion agent is selected from hydroxycarboxylic acids or salts thereof, hydroxyamides, hydroxamates, and amino acids.

4. The latex of claim 3, wherein the hydroxycarboxylic acid or salt thereof is a carboxymethyl polyol ether.

5. The latex of claim 4, wherein the carboxymethyl polyol ether is a carboxymethyl-1,2-diol, carboxymethyl erythritol, carboxymethyl sorbitol, carboxymethyl polyglycerol, or carboxymethyl glycerol.

6. The latex of claim 3, wherein the hydroxycarboxylic acid is an α-hydroxyacid or a β-hydroxyacid.

7. The latex of claim 6, wherein the α-hydroxyacid is glycolic acid, lactic acid, tartaric acid, or malic acid and the β-hydroxyacid is hydroxypropionic acid, carnitine, or salicylic acid.

8. The latex of claim 1 comprising about 0.1 wt % to 5.0 wt % of the inversion agent.

9. The latex of claim 1 comprising
   about 3 wt % to 50 wt % water;
   about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties;
   about 20 wt % or less of a latex surfactant characterized as having a hydrophilic/lipophilic balance of between 2 and 10; and
   about 0.1 wt % to 5.0 wt % of the inversion agent.

10. The latex of claim 1, wherein the inversion agent is a hydrotrope.

11. The latex of claim 1, wherein the inversion agent is characterized as having a hydrophilic/lipophilic balance of greater than about 19.

12. The latex of claim 1, wherein the latex is shelf stable.

13. The latex of claim 1, wherein the latex has a bulk viscosity at least 15% lower than the same latex excluding the inversion agent.

14. A method of forming an invertible latex, the method comprising
   (a) forming a water-in-oil latex comprising
      about 15 wt % to 70 wt % of a water soluble or dispersible polymer;
      about 3 wt % to 50 wt % water;
      about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties; and
      about 20 wt % or less of a latex surfactant characterized as having a hydrophilic/lipophilic balance of between 2 and 10; and
   (b) adding to the latex
      about 0.1 wt % to 20.0 wt % of an inversion surfactant characterized as having a hydrophilic/lipophilic balance of 10 or greater; and
      about 0.1 wt % to 5.0 wt % of a carbonyl functional inversion agent to form an invertible latex, wherein the inversion agent is not a surfactant.

15. The method of claim 14, wherein the invertible latex is shelf stable.

16. The method of claim 14, wherein the inversion agent is selected from hydroxycarboxylic acids or salts thereof, hydroxyamides, hydroxamates, and amino acids.

17. The method of claim 16, wherein the hydroxycarboxylic acid or salt thereof is a carboxymethyl polyol ether selected from carboxymethyl-1,2-diol, carboxymethyl erythritol, carboxymethyl sorbitol, carboxymethyl polyglycerol or carboxymethyl glycerol.

18. The method of claim 16, wherein the hydroxycarboxylic acid is an α-hydroxyacid selected from glycolic acid, lactic acid, tartaric acid, and malic acid, or a β-hydroxyacid selected from hydroxypropionic acid, carnitine, and salicylic acid.

19. A method of recovering hydrocarbon compounds from a subterranean reservoir, the method comprising
   (a) forming an invertible latex according to the method of claim 14,
   (b) adding a water source to the invertible latex in a single addition to form a polymer flooding solution comprising about 100 ppm to 10,000 ppm of the water soluble or dispersible polymer,
   (c) injecting the polymer flooding solution into the subterranean reservoir, and
   (d) recovering the hydrocarbon compounds.

20. The method of claim 19, wherein the water source is about 30° C. to 100° C.

21. The method of claim 19, wherein the water source includes about 0.1 to 30 wt % total dissolved solids.

22. The method of claim 19, wherein the water source is about 30° C. to 100° C. and includes about 0.1 to 30 wt % total dissolved solids.

* * * * *